(12) United States Patent
Dua et al.

(10) Patent No.: US 12,380,719 B2
(45) Date of Patent: Aug. 5, 2025

(54) GENERATING TEMPLATES FOR USE IN SYNTHETIC DOCUMENT GENERATION PROCESSES

(71) Applicant: Oracle International Corporation, Redwood Shores, CA (US)

(72) Inventors: Karan Dua, Najibabad (IN); Praneet Pabolu, Visakhapatnam (IN); Mengqing Guo, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 18/295,765

(22) Filed: Apr. 4, 2023

(65) Prior Publication Data
US 2024/0338959 A1 Oct. 10, 2024

(51) Int. Cl.
*G06V 30/19* (2022.01)
*G06F 40/186* (2020.01)
*G06V 30/412* (2022.01)

(52) U.S. Cl.
CPC ...... *G06V 30/19147* (2022.01); *G06F 40/186* (2020.01); *G06V 30/412* (2022.01)

(58) Field of Classification Search
CPC ............ G06V 30/19147; G06V 30/412; G06F 40/186; G06F 40/295
See application file for complete search history.

(56) References Cited

U.S. PATENT DOCUMENTS

| | | | |
|---|---|---|---|
| 2013/0226846 A1* | 8/2013 | Li ........................ | G06N 20/00 706/12 |
| 2016/0055132 A1* | 2/2016 | Garrison ............... | G06F 16/958 706/12 |
| 2019/0286711 A1* | 9/2019 | Terry ..................... | G06N 20/00 |
| 2023/0267273 A1* | 8/2023 | Theriappan ............ | G06N 5/022 704/9 |
| 2024/0153299 A1* | 5/2024 | Pillai ..................... | G06V 30/41 |

* cited by examiner

*Primary Examiner* — Iriana Cruz
(74) *Attorney, Agent, or Firm* — Invoke

(57) ABSTRACT

The system generates templates to be used for use in synthetic document generation. Generating a template includes selecting entities to be included in the template and/or selecting characteristics of entities in the template. The system may execute randomization functions to determine which entities, of a candidate set of entities, are to be included in a template. The randomization functions may accept, as input, probabilities associated with the entities to compute the inclusion or exclusion of entities in the template. Different entities may be associated with different corresponding probabilities. The system may execute randomization functions to determine characteristics of entities that are included in a template. The characteristics may be selected from a specific candidate set of characteristics or a range of characteristic values.

29 Claims, 22 Drawing Sheets

Merchant Details "Entity Group" present in top section of the page

The Term "Account Name" is the "Entity Header"
The Term "BANK OF AMERICA" is the "Entity Value"

The word "Details" is the "Entity Group Header"
for "Invoice Details" Entity Group Invoice Details "Entity Group" present in top section of the page

*105*

From:

BBBootstrap Inc.
546 Aston Avenue
NYC, NY 12394
Email: contact@bbbootstrap.com
Phone: +1 848 389 9289

*110*

To:

Facebook Inc.
345, SA Road
Cupertino CA 92154
Email: billings@facebook.com
Phone: +1 894 989 9898

*100*

*115*

*130*

*120* → Details:
Invoice #BBB-2454432
March 22, 2020
VAT: BBB0909090
Account Name: BANK OF AMERICA SWIFT code: 9857985679487

*125*

| # | Item | Description | UNIT | COST | Total |
|---|------|-------------|------|------|-------|
| 1 | Laptops | Macbook Air 8GB RAM, 256GB SSD | 5 | $900 | $4500 |
| 2 | Samsung SSD | Samsung SSD (256 GB) | 20 | $50 | $3000 |
| 3 | PEN DRIVES | Samsung Pendrives (32 GB) | 100 | $10 | $1000 |

Contrary to popular belief, Lorem Ipsum is not simply random text. It has roots in a piece of classical Latin literature from 45 BC, making it over 2000 years old. Richard McClintock, a Latin professor at Hampden Sydney College in Virginia.

*135*

The Term "Subtotal" is the "Entity Header"
The Term "$8500" is the "Entity Value"

| Subtotal | $8500 |
|---|---|
| Discount (20%) | $160 |
| VAT (10%) | $90 |
| Total | $9000 |

*140*

Proceed to payment

*145*

Bill Details "Entity Group" present in bottom section of the page

FIG. 1A

```
{
    "name": "MerchantDetails",
    "position": {"header": 0.9, "footer": 0.1},
    "tabulate": {"create": 0.3, "rows": 1, "tabType" : [ "horizontal" , "vertical" ]},
    "header": ["From", "Invoice From", "Biller", "Biller Details", "Merchant Details", "Merchant Information", "Sold By", ""],
    "entities": [
        {"name": "MerchantName" , "probability" :1.0, "header " :[ "Seller Name", "Merchant Name" ], "type": "company", "fontVariance": {"face": True, "sizeOffset": 4}},
        {"name": "MerchantAddress", "probability": 1.0, "header": [ "Seller Address", "Merchant Address"], "type": "address"},
        {"name" : "MerchantPhone", "probability": 0.6, "header": [ " Phone", "Mobile" ], "type": "phone" },
        {"name": "MerchantTaxId" "probability": 0.3, "header": [ "Tax ID" ], "type":"taxnum",
    "addHeader": True}
    ],
    "entityShuffleGroups": [[ "MerchantPhone", "MerchantTaxid" ]],
    "headerProbability": 0.3,
    "probability":1.0,
        "gridPosition": [ 1, 1]
},
```
300

FIG. 3

```
{
"name": "ItemDetails",
"position": {"body": 1},
"tabulate": {"create": 1, "rows": "random", "tabType": ["vertical"]},
"header": [ ],
"entities" : [
    {"name": "ItemName", "probability": 1.0, "header":[ "Item Name", "Name", "Product"], "type":
"product", "addHeader": True, "align": ["center", "right", "left"]},
    {"name": "ItemDescription", "probability": 0.7, "header": ["Description", "Memo"], "type":
"description", "addHeader": True, "align": ["center", "right", "left"]},
    {"name" : "Itemcode", "probability": 0.7, "header":[ "Item Code", "Item ID", "Product ID",
"Product Code"], "type": "Itemcode", "addHeader": True, "align": ["center", "right", "left"]},
    {"name " : "ItemPrice ", "probability": 0.7, "header": ["Price", "Per Unit Cost"], "type ": "money",
"addHeader": True, "align": ["center", "right", "left"]},
    {"name": "ItemUnit", "probability": 0.5, "header":["Unit", "Quantity"], "type": "number",
"addHeader": True, "align": ["center", "right", "left"]},
    {"name ": "ItemTax", " probability": 0.2, "header ":["Tax", "VAT"], "type": "money", "addHeader":
True, "align": ["center", "right", "left"]},
    {"name " : "ItemTotal ", "probability": 1.0, "header " :[ "Total", "Amount", "Item Total", "Product
Total"], "type": "money", "addHeader": True, "align": ["center", "right", "left"]}
    ],
"entityShuffleGroups": [[ "ItemName", "ItemCode", "ItemDescription" ], [ "ItemPrice", "ItemUnit"]],
"headerProbability": 0,
"probability": 1.0
}
```

FIG. 3 (Continued)

| Shipped to<br>Electronics Hardware Analysis<br>Jason Landing<br>Port Vanessa<br>10041    grid position - (0,0) | To<br>Aaron Alvarado<br>+1850 328-8388<br><br>grid position - (0,1) | Divided into grid of size 4x3<br>i.e. 4 rows and 3 columns<br><br>grid position - (0,2) |
|---|---|---|
| Mrs. Emily Stewart<br><br><br>grid position - (1,0) | grid position - (1,1) | Seller Name   Merchant    Tax ID       Phone<br>                        Address<br>Electronics    Paul Motorway   vbioj-766476718   (606) 151-7082<br>Bylons          Wonderstad, Utah<br>                 37879<br>                 USA<br>                                                                    grid position - (1,2) |
| grid position - (2,0) | grid position - (2,1) | Land likely someone professor military through minute.<br>Fish few hit cover interview blood.<br>Town drop century imagine travel bar although.<br>Nice adult father start.<br>Than style environment medical his yet machine.<br>grid position - (2,2) |
| grid position - (3,0) | grid position - (3,1) | Invoice Details<br>Invoice Number: HZICa-7979981935<br>Invoice Date: 1997-11-02<br>Due Date: 2000-07-25<br>PO Number: MMCDZ747745060<br>grid position - (3,2) |

The height and width of all the rows and columns here dynamic and unequal based on the size of the largest entity group

FIG. 7

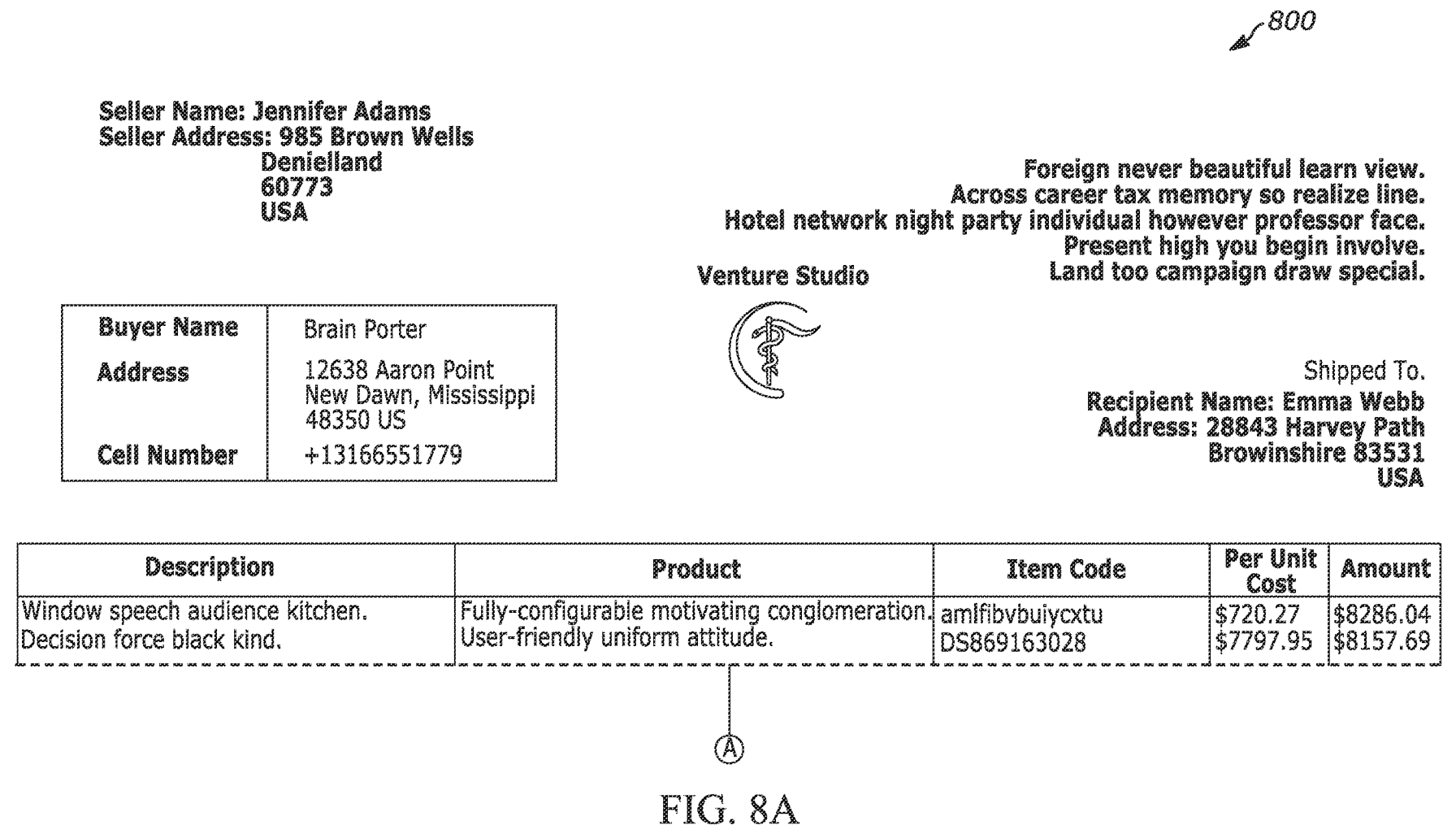

Foreign never beautiful learn view.
Across career tax memory so realize line.
Hotel network night party individ

| | | | |
|---|---|---|---|
| Begin individual show one. | User-friendly upward-trending architecture | aq61385025 | $3090.85 | $904.34 |
| Develop every capital economic. | Configurable asynchronous database | d609372123 | $5882.9 | $9626.54 |
| Budget wish sure write heart. | Phased uniform application | BuVHD5LdYqyYvhPp | $1918.71 | $2113.64 |
| Thus behavior allow student our must. | Synergized executive toolset | febcwpntzx | $108.02 | $9117.98 |
| Economy itself debate prove. | Versatile object-oriented challenge | LZKX112609631 | $5359.16 | $330.15 |
| World weight population feeling lay. | Diverse 3rd generation benchmark | BLI7360B074 | $1387.69 | $1899.72 |
| Imagine present tree your bank manager. | Reduced coherent knowledge user | Icbpeyp

| | | | |
|---|---|---|---|
| Begin individual show one. | User-friendly upward-trending architecture | aq615385025 | $3090.85 | $9004.34 |
| Develop every capital economic. | Configurable asynchronous database | d609372123 | $5882.9 | $9626.54 |
| Budget wish sure write heart. | Phased uniform application | BuVHD5LdYqyYvnPp | $1918.71 | $2113.64 |
| Thus behavior allow student our must. | Synergized executive toolset | febcwpntzx | $108.02 | $9117.98 |
| Economy itself debate prove. | Versatile object-oriented challenge | LZKX112609631 | $5359.16 | $330.15 |
| World weight population feeling lay. | Diverse 3rd generation benchmark | BLI7360B074 | $1387.69 | $1899.72 |
| Imagine present tree your bank manager. | Reduced coherent knowledge user | icbpeypsz | $1247.66 | $8331.58 |
| Outside laugh wall chair day available. | Optional zero tolerance data-warehouse | xMAlz294239247 | $3602.19 | $465.4 |
| Site strong everybody better. | Progressive multi-state policy | VDGABNIHDZVQT | $4734.93 | $669.32 |
| Meet letter we modern magazine head. | Realigned logistical service desk | qpWsXuSbQepWGjE | $5609.89 | $1628.91 |
| Indeed whole technology house. | Seamless tangible complexity | QRMSFOWVDDDZ | $7066.59 | $592.65 |
| Make their city ten reach very. | Face-to-face context-sensitive system engine | Immmt5kbwbuveron | $7713.41 | $1303.27 |
| Walk group about. | Face-to-face mobile frame | BwpLRbVT5pqwNgVpozgC | $7326.79 | $8870.47 |
| Music effect look movement decade. | Universal multi-tasking middleware | qEQyD915656921 | $574.21 | $1161.17 |
| Idea job dinner Democrat well. | Reduced explicit help-desk | ZWbf597691724 | $9556.29 | $5233.54 |

| | |
|---|---|
| Sub Total | $655.28 |
| 10% VAT | $9926.17 |
| Grand Total | $1251.82 |

Terms & Conditions
Payment to made within 30 days.
Payment will be credited within 24 hours of deposit.

Please note
Actually war change unit.
Save policy into itself follow.
Deal water role operation move.
Around process phone look child note strategy.
Worker deal make behind tree boy age.
Less heart improve goal offer indicate anyone.

Customer Information
Direct Electronics Hill
715577-5201

Shipped To
Jennifer Gonzalez
Ramirez Corners
Warrenfurt, Delaware
70231

| Item Name | Item ID |
|---|---|
| Streamland didactic open architecture | tarjyngekwjx |
| Programmable zero administration Local Area Network | p137036450 |
| Balanced systemic capacity | lujdlekgecrojcjdd |
| Ergonomic impactful database | TCBNAQSFHHDCWLNY |
| Self-enabling client-driven benchmark | sqi867337253 |
| Monitored analyzing concept | phnajkoeiu |
| Devolved methodical hardware | CFVAXZKJBBKEFMYHPAC |
| Phased content-based time-frame | yFQoEMpWQMwupJwXaVhP |
| Reactive object-oriented archive | k488336930 |
| Open-source needs-based knowledge user | xK897119048 |
| Open-architected local product | APPV947179933 |
| Programmable asymmetric concept | HYRPQ820250875 |
| Exclusive methodical encoding | mj959507847 |

Ⓐ

Conditions
Payment will be credited within 24 hours of deposit.

FIG. 9A

Net Future Technology
6586 Cox Stream
North Kathryn 57967
US

| Description | Quantity | VAT | Item Total |
|---|---|---|---|
| House well appear government. | 4072 | $2402.41 | $6333.17 |
| Image magazine be at fear girl same. | 7921 | $7269.89 | $8342.4 |
| Usually maybe man. | 3099 | $4433.65 | $9756.59 |
| Cut enter full structure. | 9800 | $7929.85 | $9353.48 |
| Concern down condition expert he push. | 4267 | $7761.33 | $6207.31 |
| Social eye firm participant these. | 7862 | $9444.17 | $1489.14 |
| Open defense staff fire. | 5510 | $5130.36 | $7934.94 |
| Civil lose stay. | 5748 | $3115.8 | $8293.92 |
| Born land economic improve teach. | 3355 | $7718.97 | $1729.09 |
| Catch note likely son myself argue. | 8234 | $6876.51 | $9298.95 |
| Under religious through free. | 9873 | $477.58 | $9235.92 |
| Third yourself both sign. | 7565 | $2188.87 | $7183.35 |
| Season manage point result believe. | 7055 | $8773.04 | $8541.1 |

Invoice Details
Invoice Date: 1998-07-13
Invoice Number: okk-306683210
Due Date: 1977-10-20

Bill Summary
Sub Total: $989.07
VAT: $9996.42
Grand Total: $3864.4

Kitchen huge live call religious quite.
Who tend month race ten enviromental same hold.
Situation change several keep.
Agency tree result war bit white.
Some force water sense.
Part event entire Mr.
Federal effort course board next fly.
History cold ok brother child fast today body

FIG. 9A(Continued)

```
                    19                              137,
                ],                                  198
             "Shipped"                           ],
           ],                                    [
           [                                        63,
              [                                     15
                145,                             ],
                174                              "Gonzalez"
              ],                               ]
              [                              ],
                17,                          "class": "ShippingRecipient"
                16                         },
              ],                           {
              "To"                           "entity": [
           ]                                   [
        ],                                        79,
        "class": "Shipping Details_header"        218
      },                                       ],
      {                                        [
        "entity": [                               145,
           [                                      56
              [                                ],
                79,                          "Ramirez Corners Warrenfurt,
                198                       Delware 70231"
              ],                              ],
              [                               "children": [
                121,                            [
                15                                [
              ],                                    79,
              "Jennifer Gonzalez"                   218
           ],                                    ],
           "children": [                         [
              [                                     53,
                [                                   15
                  [                             ],
                    79,                         "Ramirez"
                    198                       ],
                  ],                           [
                  [                               [
                    54,                             136,
                    15                              218
                  ],                            ],
                  "Jennifer"
                ],
                [
                  [
```

FIG. 9B

Customer Information
Direct Electronics Hill
715577-5201

Shipped To
Jennifer Gonzalez — 930
Ramirez Corners
Warrenfurt, Delaware
70231

| Item Name | Item ID |
|---|---|
| Streamland didactic open architecture | tarjyngekwjx |
| Programmable zero administration Local Area Network | p137036450 |
| Balanced systemic capacity | lujdiekgecrojcjdd |
| Ergonomic impactful database | TCBNAQSFHHDCWLNY |
| Self-enabling client-driven benchmark | sqi867337253 |
| Monitored analyzing concept | phnajkoeiu |
| Devolved methodical hardware | CFVAXZKJBBKEFMYHPAC |
| Phased content-based time-frame | yFQoEMpWQMwupJwXaVhP |
| Reactive object-oriented archive | k488336930 |
| Open-source needs-based knowledge user | xK897119048 |
| Open-architected local product | APPV947179933 |
| Programmable asymmetric concept | HYRPQ820250875 |
| Exclusive methodical encoding | mj959507847 |

— 920 (top right)
— 930 (various callouts)
Ⓐ

Conditions
Payment will be credited within 24 hours of deposit. — 930

Net Future Technology
6586 Cox Stream
North Kathryn 57967
US

*930*  *930*

| Description | Quantity | VAT | Item Total |
|---|---|---|---|
| House well appear government. | 4072 | $2402.41 | $6333.17 |
| Image magazine be at fear girl same. | 7921 | $7269.89 | $8342.4 |
| Usually maybe man. | 3099 | $4433.65 | $9756.59 |
| Cut enter full structure. | 9800 | $7929.85 | $9353.48 |
| Concern down condition expert he push. | 4267 | $7761.33 | $6207.31 |
| Social eye firm participant these. | 7862 | $9444.17 | $1489.14 |
| Open defense staff fire. | 5510 | $5130.36 | $7934.94 |
| Civil lose stay. | 5748 | $3115.8 | $8293.92 |
| Born land economic improve teach. | 3355 | $7718.97 | $1729.09 |
| Catch note likely son myself argue. | 8234 | $6876.51 | $9298.95 |
| Under religious through free. | 9873 | $477.58 | $9235.92 |
| Third yourself both sign. | 7565 | $2188.87 | $7183.35 |
| Season manage point result believe. | 7055 | $8773.04 | $8541.1 |

Ⓐ

Invoice Details
Invoice Date: 1998-07-13
Invoice Number: okk-306683210
Due Date: 1977-10-20

*930*

Bill Summary
Sub Total: $989.07
VAT: $9996.42
Grand Total: $3864.4

*930*

Kitchen huge live call religious quite.
Who tend month race ten enviromental same hold.
Situation change several keep.
Agency tree result war bit white.
Some force water sense.
Part event entire Mr.
Federal effort course board next fly.
History cold ok brother child fast today body.

FIG. 9C(Continued)

GENERATING TEMPLATES FOR USE IN SYNTHETIC DOCUMENT GENERATION PROCESSES

TECHNICAL FIELD

The present disclosure relates to machine learning techniques and applications. In particular, the present disclosure relates to controlled randomization for generating low-template, labelled, synthetic document datasets for training document AI models.

BACKGROUND

Business documents such as invoices are typically formatted according to patterns. Different businesses typically use different patterns in their business documents, although their differently-patterned business documents may include substantially similar information.

Machine learning (ML) models (e.g., artificial intelligence (AI) models) are typically trained to recognize patterns using training data sets that exhibit the patterns of information the models are anticipated to encounter in the future. Based on this training, the ML models may generate useful output information upon analyzing input information that is compatible with the training data sets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 1A and 1B show an exemplary business document in the form of an invoice.

FIG. 7 shows an example invoice of a synthetic ML model training document illustrating layout adjustments made by the dynamic virtual grid engine.

FIGS. 8A, 8B, and 8C show an example of an invoice generated as a synthetic ML model training document, an example subset of annotations for entity groups and/or entities included in the invoice, and the example invoice having the annotated entity groups and/or entities highlighted, respectively.

FIGS. 9A, 9B, and 9C show an example of an invoice generated as a synthetic ML model training document, an example subset of annotations for entity groups and/or entities included in the invoice, and the example invoice having the annotated entity groups and/or entities highlighted, respectively.

DETAILED DESCRIPTION

Figure 1B:
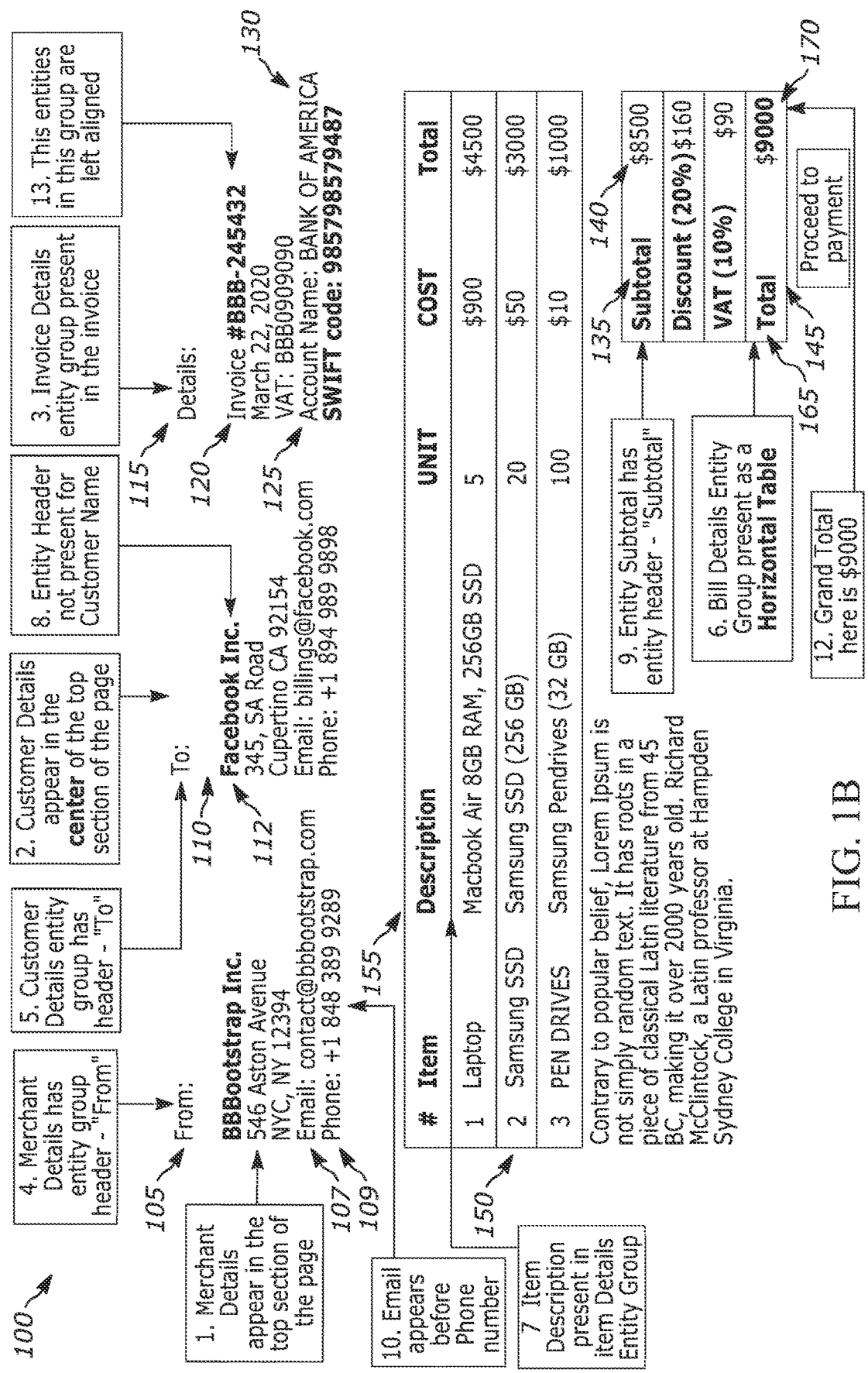

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DOCUMENT TYPES
3. TEMPLATE GENERATION SYSTEM
4. GENERATING TEMPLATE DOCUMENTS AND SYNTHETIC ML MODEL TRAINING DOCUMENTS
5. ILLUSTRATIVE EXAMPLES
6. HARDWARE OVERVIEW
7. COMPUTER NETWORKS AND CLOUD NETWORKS
8. MICROSERVICE APPLICATIONS
9. MISCELLANEOUS; EXTENSIONS

1. General Overview

One or more embodiments generate templates to be used for synthetic document generation. Generating a template includes selecting entities to be included in the template and/or selecting characteristics of entities in the template. The operations for generating the template may be performed by a machine learning (ML) model training document generation system. The same system or a different system may use the template to synthetically generate a document by selecting values for entities defined in the template.

The system may execute randomization functions to determine which entities, of a candidate set of entities, are to be included in a template. The randomization functions may accept, as input, probabilities associated with the entities to compute the inclusion or exclusion of entities in the template. Different entities may be associated with different corresponding probabilities. In addition to the entities selected for inclusion via the randomization functions, the system may include additional entities that are statistically defined for inclusion.

The system may execute randomization functions to determine characteristics of entities that are included in a template. The characteristics may be selected from a specific candidate set of characteristics or a range of characteristic values.

One or more embodiments described in this Specification and/or recited in the claims may not be included in this General Overview section.

2. Document Types

The training corpus for training a ML model to extract information from documents may include a large set of sample documents, for example, thousands to hundreds of thousands of documents, including information formatted according to a number of different patterns. A typical pattern of a document may include:

- A known number and types of entities. An entity may define a type of information included in a document, and may be specified with an entity name (e.g., Merchant Name), an entity heading (e.g., how an entity may be optionally called out on a page, such as "Merchant", "Seller", or "Payee" on an invoice), and entity type (e.g., the type of information associated with the entity (e.g., text, number, date). Documents typically include a limited quantity of entities. Different types of documents typically include different sets of entities, because different types of documents typically include different information. For example, an invoice may include the following entities of the specified types:
  Merchant Name: text
  Customer Name: text
  Invoice Date: date
  Due Date: date
  Currency Amount: number
  Currency Type: text
- A set of entities in a document may be divided into distinct entity groups. An entity group may be specified with an entity group name (e.g., Merchant Details), an entity group header (e.g., how an entity group may be optionally called out on a page, such as "Payee Contact Information", "Seller Info", or "Merchant Contact Info" on an invoice), and a list of entities included in the entity group. The entities in the respective distinct entity groups may be related to each other, e.g., according to one or more common characteristics or usages. For example, an invoice may include the following groups of entities:
  Merchant Details (may include the following entities: Merchant Name, Merchant Address, Merchant Phone Number, Merchant Fax Number, Merchant Email Address, Merchant Website, and other entities corresponding to various other details about the merchant)
  Customer Details (may include the following entities: Customer Name, Customer Address, Customer Phone Number, and other entities corresponding to various other details about the customer)
  Product Details (may include the following entities: Product SKU, Product Quantity, Product Name, Product Description, Product Unit Price, Product Sale Price, Product Subtotal, and other entities corresponding to various other details about the product)
  Invoice Details (may include the following entities: Total Amount, Tax Amount, Currency Type, Invoice Number, Invoice Date, and other entities corresponding to various other details about the invoice)
  Payment Terms (may include the following entities: Due Date, Minimum Payment Amount, Interest Rate, Late Fee, Grace Period, and other entities corresponding to various other details about the payment terms)
- Coordinate positions on a document of the groups of entities may be limited to specific ranges, and the range limitations may be different for different groups of entities. For example, in an invoice, Merchant Details may be positioned in an upper portion (e.g., a top section) of the invoice page, Product Details may be positioned in a middle portion of the invoice page, and Payment Terms may be positioned in the bottom portion of the invoice page.
- Document layouts are typically homogenous for documents of a given type from a same business. For example, invoices provided by one business may have a consistent layout, while other types of documents (e.g., purchase orders) from the same business may have a different consistent layout. The homogeneity may apply to font types, font sizes, font colors, and alignments within and across entity groups on the page within a document.

FIGS. 1A and 1B show an exemplary business document 100 in the form of an invoice. The exemplary document 100 is shown as having a pattern including entity group "Merchant Details" 105, entity group "Customer Details" 110, entity group "Invoice Details" 115, entity group header "Details" 120, entity header "Account Name" 125, entity value "BANK OF AMERICA" 130, entity header "Subtotal" 135, entity value "$8500" 140, and entity group "Bill Details" 145. Other information values included in the document 100, as well as associated formatting and layouts, may be captured and categorized using various entity names and types, entity group names and types, component names and types, and/or characteristic names and types without limitation in various other examples.

Differences between different patterns used by different businesses may be stochastically modeled using probability functions by treating the differences as random according to probabilistic distributions. Analyzing differences between the formatting or patterns of documents provided by different businesses may provide the following insights that may be leveraged to determine relevant stochastic models:

- Some entity groups may be present in any section of a page. For example, a Merchant Details Group (which may include the related entities Merchant Name, Merchant Address, etc.) may be present in a top section of an invoice page from some businesses and in a bottom section of an invoice page from other businesses.
- Some entity groups that are observed as being present in only one section of a page when documents from a given collection of different businesses are analyzed, may be present in a variety of different coordinate positions (e.g., left side, right side, middle, etc.) within the section depending upon the business that provided the document. For example, invoices from different businesses in a collection of businesses may include the entity group Customer Details in the top-left, top-right, or top-center section of the page.
- Some entity groups may be omitted from some documents of a given type and included in other documents of the same given type from different businesses. For example, the entity groups Invoice Details, Shipping Details, Payment Terms, and other entity groups may be included in invoices from some businesses yet omitted in invoices from other businesses.
- Some entity groups may include entity group headers in documents from some businesses and do not include entity group headers in corresponding documents from other businesses. For example, some invoices from some businesses may clearly identify an entity group Merchant Details by a header "Seller Information", whereas other invoices from other businesses may simply provide the Merchant Details entity group without specifically calling it out with a header.
- Entity groups may include a random assortment of different entity group headers, or no entity group headers, in documents from various different businesses. For example, some invoices from some businesses may identify an entity group Customer Details by one of various headers such as "Customer Information", "Customer Details", "Buyer Contact Info", "Client Information", etc., or no entity group header at all.

Entity groups may be provided in a document in various different formats, for example, as a stacked format, as a table, as a series of entities separate by commas, or other formats. For example, an entity group Bill Details may be presented in invoices from some businesses as a stack of values (e.g., Subtotal, Tax, etc.), and may be presented in invoices from other businesses in a tabular format. When the entity group is presented in tabular format, the table may be either horizontally organized or vertically organized. There may be different quantities of rows in tables for different invoices, even from a same business, in which entities (e.g., Item Details) are presented in a vertical format. Tables may also be structured differently in documents from different businesses, for example, having different formatting of borders, column/row widths/height, column/row separators, column/row colors/shading, etc.

Some documents from some businesses may include particular entities while other corresponding document from other businesses may not include those particular entities. For example, some invoices from some businesses may include entities Item Description, Customer Address, Invoice Due Date, and/or Purchase Order Number, whereas other invoices from other businesses may not include one or more of those entities.

Some entities may include entity headers in documents from some businesses and may not include entity headers in corresponding documents from other businesses. For example, some invoices from some businesses may clearly identify an entity such as Customer Name by a header "Customer Name", "Buyer Name", or the like, whereas other invoices from other businesses may simply provide the Customer Name entity without specifically calling it out with a header. The probability that an entity's header would be included in a document may be impacted by how difficult it would be to infer that a value provided in the document is for the specific entity in the absence of an entity header. For example, a Merchant Tax ID Number or a Customer Tax ID Number without a corresponding header in an invoice or purchase order document may be difficult to identify by a person without a corresponding header, and as a result, the probability that a header for the Tax ID Number entity would be provided in the document may be high.

Some entities may include headers that are randomly set (e.g., selected from a group of potentially relevant headers) for different documents from different businesses. For example, various businesses may use different headers for the entity Subtotal, or may omit a header for the entity Subtotal, in an invoice. Examples of potential headers for the entity Subtotal may include "Subtotal", "Sub-Total", "Sub-total Amount", "Sub Total Value", etc. Examples of potential headers for the entity Customer Name may include "Customer Name", "Buyer Name", "Payer Name", "Client Name", etc.

Various documents of a given type (e.g., invoice) from different businesses may include entities within a given entity group in different orders, sequences, and formats from one another. Some entities for a given entity group may be omitted from documents of a given type (e.g., invoice) from some businesses while included in documents of the given type from other businesses. For example, the relative positions of the entities "Item Name", "Item Code", and "Item Description" in an Item Details Table of an invoice may be interchanged with each other in some businesses' invoices relative to other businesses' invoices.

Entities of a given type in various documents of a given type (e.g., invoice) from different businesses may use different values of characteristics such as font, color, type size, etc. The entity headers and the entity values may each have different values of the characteristics for the documents of the given type from different businesses.

Entity groups of a given type in various documents of a given type (e.g., invoice) from different businesses may use different values of characteristics such as font, color, type size, etc. The entity group headers may each have different values of the characteristics for the documents of the given type from different businesses.

Actual entity values, for example, values of "Joe" or "Joy" for Customer Name, in different documents of a given type (e.g., invoice) from different businesses may be different.

Given entities in documents of a given type from different businesses may be aligned differently from one another, for example, center-aligned, left-aligned, or right-aligned. The alignment of the entities in the documents may be dependent not only upon the business that created the document, but may also depend upon the nature of the values of the entities. For example, Item Price may be right-aligned in an Item Details Table of an invoice, while Item Description may be left-aligned in the Item Details Table.

Figure 2:
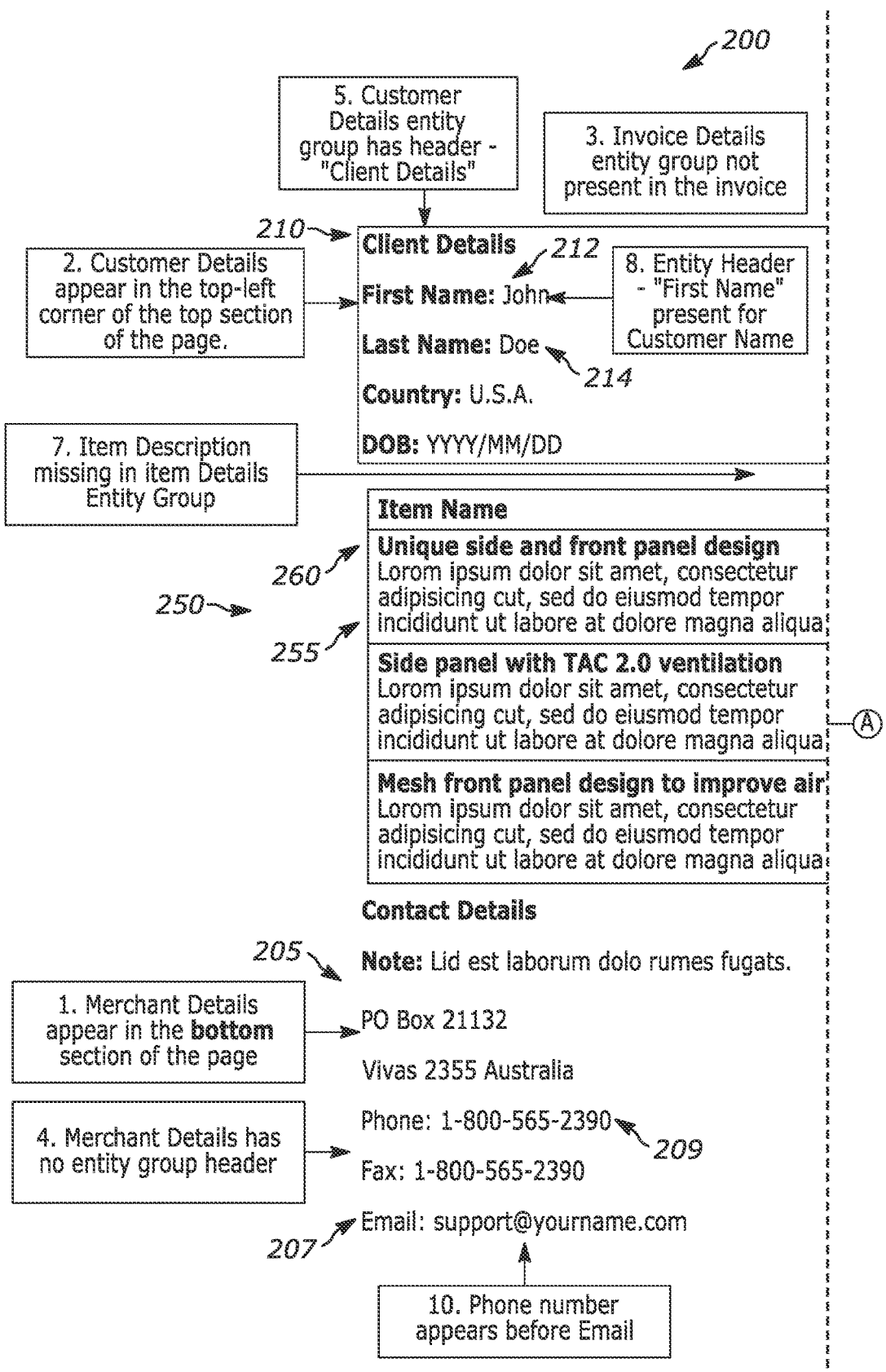
FIG. 2 shows an exemplary business document in the form of an invoice.
Figure 2:
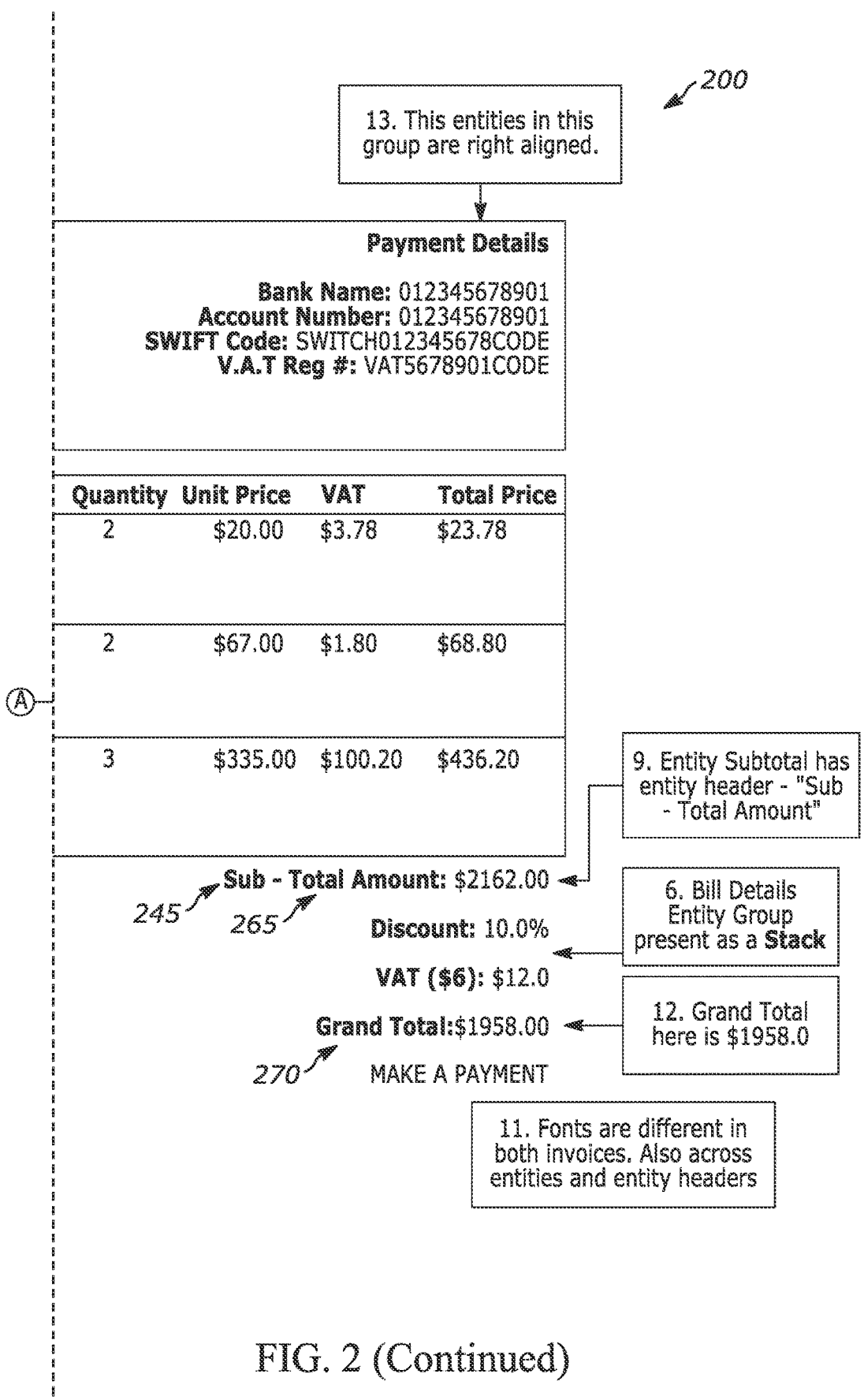

FIG. 2 shows an exemplary business document 200 in the form of an invoice. Business documents 100 and 200 may be provided by different source organizations, for example, different business organizations. Business documents 100 and 200 show similar types of information, but in different formats and in different positions on their respective pages. In addition, business documents 100 and 200 each show that similar information is provided in different layouts and formats, according to different patterns, while some information is provided in one but not the other. For example, fonts may be different in each of the business documents, as well as different across entities and entity headers. Business documents 100 and 200 are merely examples of possible business documents to illustrate the concepts discussed herein, and should not be construed as limiting, as various other types and formats of business documents may include different exemplary information corresponding to various different exemplary entity groups, entities, components, and characteristics in various layouts and formats according to various patterns.

For example, business document 100 includes an entity group Merchant Details 105 having an entity group header "From" in a top-left section of the page, whereas business document 200 includes a corresponding entity group Merchant Details 205 having no entity group header in a bottom-left section of the page. The entity group Merchant Details 105 of business document 100 includes an entity Email Address 107 having entity header "Email" placed above an entity Phone Number 109 having an entity header "Phone", whereas the corresponding entity group Merchant Details of business document 200 includes an entity Email Address 207 having entity header "Email" placed several lines below an entity Phone Number 209 having an entity header "Phone".

For example, business document 100 includes an entity group Invoice Details having an entity group header "Details" in a top-right section of the page in the form of a stack in which the constituent entities are left-aligned. In contrast, business document 200 includes a corresponding entity group Invoice Details having a header "Payment Details" positioned in a top-right of the page in the form of a stack with the constituent entities being right-aligned with each other.

For example, business document 100 includes an entity group Customer Details 110 having an entity group header "To" positioned in a top-center section of the page, in which a constituent entity Customer Name 112 does not include an entity header. In contrast, business document 200 includes a corresponding entity group Customer Details 210 having an entity group header "Client Details" positioned in a top-left section of the page, in which constituent entities Customer First Name 212 and Customer Last Name 214 each have corresponding entity headers "First Name" and "Last Name", respectively.

For example, business document 100 includes an entity group Item Details 150 presented in the form of a table arranged with numerous rows of Item Details entries, each of which includes an entity Item Description 155 in a column under an entity header "Description" at the top of the table. In contrast, business document 200 includes a corresponding entity group Item Details 250 presented in the form of a table arranged with numerous rows of Item Details entries, each of which includes an entity Item Description 255 presented just below a corresponding entity Item Name 260 in a column under an entity header "Item Name", but which does not include an entity header for the entity Item Description. In other words, the entity Item Description in the entity group Item Details in the business document 200 does not include an entity header "Item Description" or any other entity header.

For example, business document 100 includes an entity group Bill Details 145 presented in a bottom-right section of the page in the form of a horizontally arranged table. The entity group Bill Details of the business document 100 includes an entity Subtotal 135 having an entity header "Subtotal" and entity value "$8500" 140 in a top row and an entity Total 165 having an entity header "Total" and entity value "$9000" 170 in a bottom row of the horizontally arranged table. In contrast, business document 200 includes a corresponding entity group Bill Details 245 also presented in a bottom-right section of the page in the form of a stack. The entity group Bill Details 245 of the business document 200 includes an entity Subtotal 265 having an entity header "Sub-Total Amount" and entity value "$2162.00" at a top of the stack and an entity Total 270 having an entity header "Grand Total" and entity value "$1958.0" in a bottom of the stack.

Figure 3:
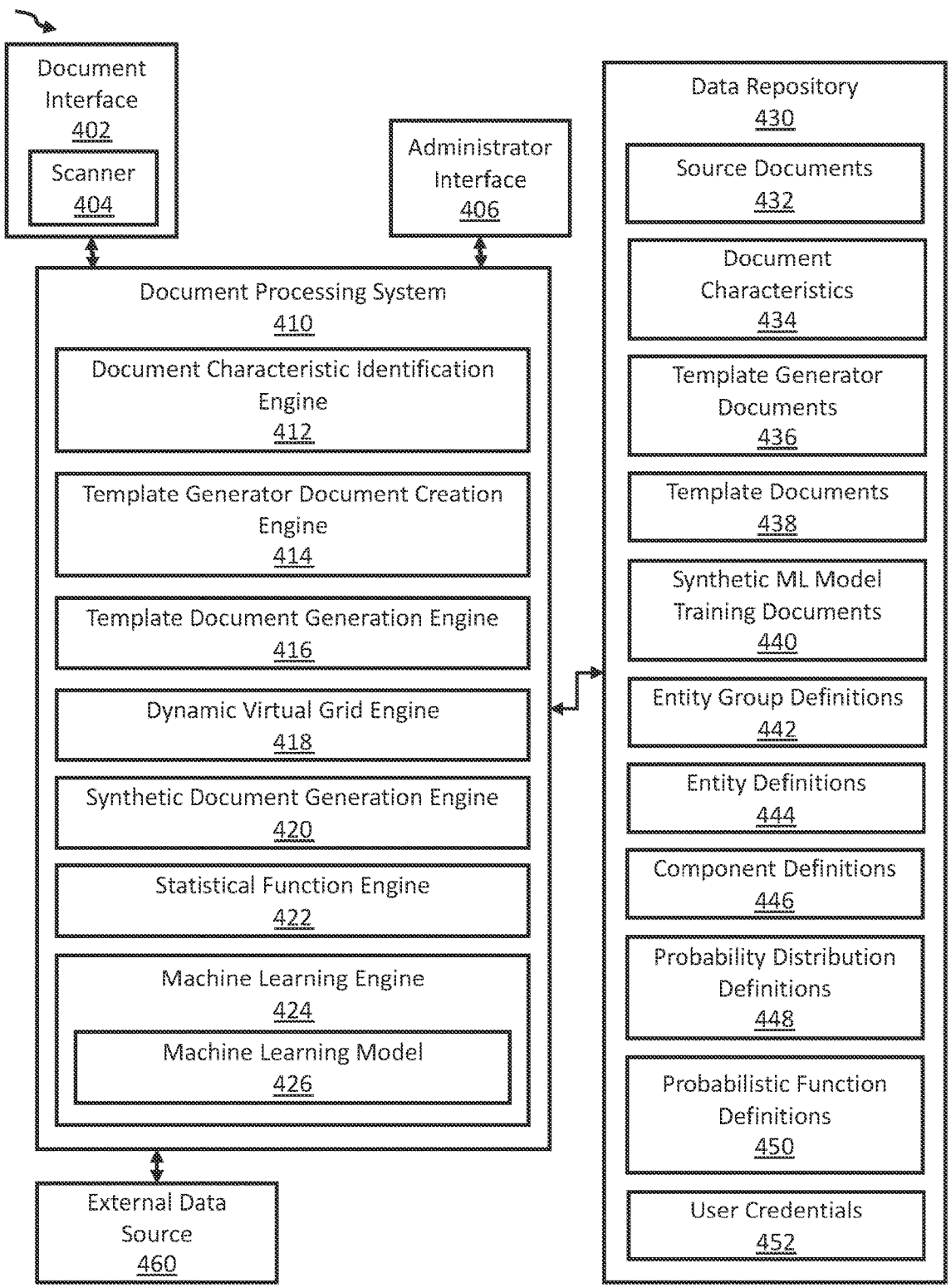
FIG. 3 represents an exemplary template generator document including several exemplary entity groups.

FIG. 3 represents an exemplary template generator document 300 including several exemplary entity groups. According to various embodiments, a template generator document is a collection of template information that may take any format, and may be stored in one or more data units, e.g., files. The template generator document 300 may be used to determine the entity groups, entities, components, and characteristics that are included and utilized in training documents synthesized based on the template generator document 300, which can be used to train an ML model. The template generator document 300 may be used to create multiple different template documents that each include variations of entity groups, entities, components, and characteristics that are based on statistical specifications included in the template generator document 300. The template documents may each be used to create one or more different training documents synthesized to replace random variables in the template documents with dummy values selected based on specified probabilities associated with the variables. The exemplary template generator document 300 includes various entity groups and associated probabilities (e.g., "MerchantDetails", "ItemDetails", etc.), entities and associated probabilities (e.g., "MerchantName", "MerchantAddress", etc.), components and associated probabilities (e.g., "header"), characteristics and associated probabilities (e.g., "position"), and value patterns and associated probabilities related to any of these. The exemplary template generator document 300 should not be construed as limiting, as in various embodiments, template generator documents may include various other data in various other formats, for example, binary formats, markup language formats, JSON formats, and more. Where probability values are specified in the exemplary template generator document 300, various examples may also include corresponding specifications of probability distribution functions and associated parameters and/or formulas dependent upon other entities and/or information included in the respective template generator document. In an example, a probability distribution function may be specified proximate to a corresponding probability value in the template generator document. In an example, a probability distribution function may be specified at a global level within the template generator document to be applicable for all probability values specified within the template generator document. In an example, probability distribution functions and/or associated parameters may not be included in the template generator document in conjunction with one or more specified probability values, and these one or more specified probability values may be interpreted as corresponding to a default probability distribution function (e.g., uniform). In an example, a probability distribution function may be specified at a global level within the template generator document to be applicable for all probability values within the template generator document that are specified without a proximate specification of a corresponding probability distribution function. A loose templating methodology may be utilized for exemplary template generator document 300 to facilitate generation of synthetic data using the template information in the template generator document 300, based on the methods described herein. The methods described herein may make random decisions based on probabilities specified in the template generator document 300 to generate permutations of documents according to the specified probabilities.

TABLE 1

Explanation of various JSON keys used in the template format illustrated in exemplary template generator document 300.

| JSON Key | Type of Value Expected for Key | Description |
| --- | --- | --- |
| name | String value | Describes the name of the entity group. This name may appear in the annotation for entity group headers added to the output training document. For example, the label for the header of entity group "Merchant Details" may appear as "MerchantDetails_header" in the annotation |

TABLE 1-continued

Explanation of various JSON keys used in the template format
illustrated in exemplary template generator document 300.

| JSON Key | Type of Value Expected for Key | Description |
|---|---|---|
| position | Dictionary containing specifications of probabilities for the entity group to be present in certain sections of the output training document page | Specifies probabilities for the entity group to be present in various sections of the output training document page. May contain probability values for "header" (top section), "body" (center section) and "footer" (bottom section).<br>Specified probabilities may be configured to add up to 1. At runtime, the method of generating the training documents may determine the probability that the entity group is placed in a particular document section for a particular training document instance and the coordinate position of the entity group on the training document instance page based on the probabilities defined here. |
| Tabulate | Dictionary describing the probability of the entity group to be created as a table, the number of rows to be created in the table (may be an integer or "random"), and list of possible table types (e.g., "horizontal" or "vertical") | Given the probability of the entity group to be created as a table, the method of generating the training documents, at runtime, may determine whether the entity group is created as a table and the likelihood of the same is based on the probability value defined here.<br>The number of rows in the table may either be randomly generated or limited to the number of rows defined in the "rows" key. The values in the rows may be based on the entities defined in the entity group.<br>The table may be oriented as horizontal or vertical. The orientation may be determined randomly by the method at runtime based on the type specified in the "tabType" key. |
| Header | List of strings containing the possible values that the entity group header may take | One of the values from this list may be randomly assigned as the entity group header by the method during runtime and may be written as an entity group header in the resultant training document(s). |
| entities | List of dictionaries describing the entities expected in the output training document (e.g., invoice). Each dictionary may contain the following:<br>"name": Name of the entity<br>"probability": Probability of the respective entity being included in the output training document<br>"header": List of string headers that an instance of the entity may be assigned<br>"type": Type of value that the entity may be assigned<br>"fontVariance" (optional): Describes whether the font for this entity should be different from the global entity font<br>"addHeader" (optional): True/ False depending on whether the entity requires a header to be assigned and included in the | "name" is used as a label in the output annotation for the generated invoices.<br>"probability" is the likelihood of this entity being present in the invoice. The algorithm, at the runtime, decides whether the entity should be present and the likelihood of the same is based on the probability defined here.<br>"header": One of the values from this list is taken randomly by the algorithm during runtime and is written as an entity header in the resultant image.<br>"type": Defines the type of entity. The algorithm generates a dummy value for the entity based on this type. "fontVariance": Some entities like Merchant Name have bigger and different font face from the rest of the image. The "face" decides whether the font face should be different from rest of the entities and size offset defines how much larger the font should be from other entities.<br>"addHeader": A configurable global probability decides whether the invoice will contain entity headers. So, the algorithm may decide that the entity headers won't be included in the invoice. However, some of the entities like "Tax ID", "Total Amount" definitely need entity header otherwise it will be impossible to interpret their value. This key allows you to configure if an entity mandatorily needs an entity header irrespective of global choice for the invoice.<br>"align": A list of all the alignment options. One of the alignment options from list is chosen randomly and the entity is aligned accordingly on the page. |

TABLE 1-continued

Explanation of various JSON keys used in the template format
illustrated in exemplary template generator document 300.

| JSON Key | Type of Value Expected for Key | Description |
| --- | --- | --- |
| | instance of the training document "align": (optional): List of possible alignment options for the entity. May contain one of more values selected from "left", "righ", and "center". | |
| entityShuffle-Groups | List of lists defining which entities may be shuffled in sub-groups | The algorithm, at the runtime, randomly shuffles these entities in sub-groups. Each list in this key defines a shuffle sub-group and only those entities can take each other's position in the entity group. |
| headerProba-bility | Float value | "headerProbability" is the likelihood of this entity group having an entity group header. The algorithm, at the runtime, decides whether the entity group header should be present and the likelihood of the same is based on the probability defined here. |
| Probability | Float value | "probability" is the likelihood of this entity group being present in the invoice. The algorithm, at the runtime, decides whether the entity group should be present and the likelihood of the entity group to be present is based on the probability defined here. |
| gridPosition | List defining row and column number for the output training document page instance. Should be unique for each entity group and within the bounds of the grid size | "gridPosition" is an override mechanism for the computer-implemented algorithmic method of determining a coordinate position on the page grid for the entity group to be placed. For example, for invoices, the Bill Details may be typically presented at a fixed coordinate position. This attribute may ensure that the computer-implemented method uses this specified coordinate position instead of generating a random coordinate while generating random coordinate positions for other entity groups that do not specify a fixed coordinate position. |

3. Template Generation System

Figure 4:
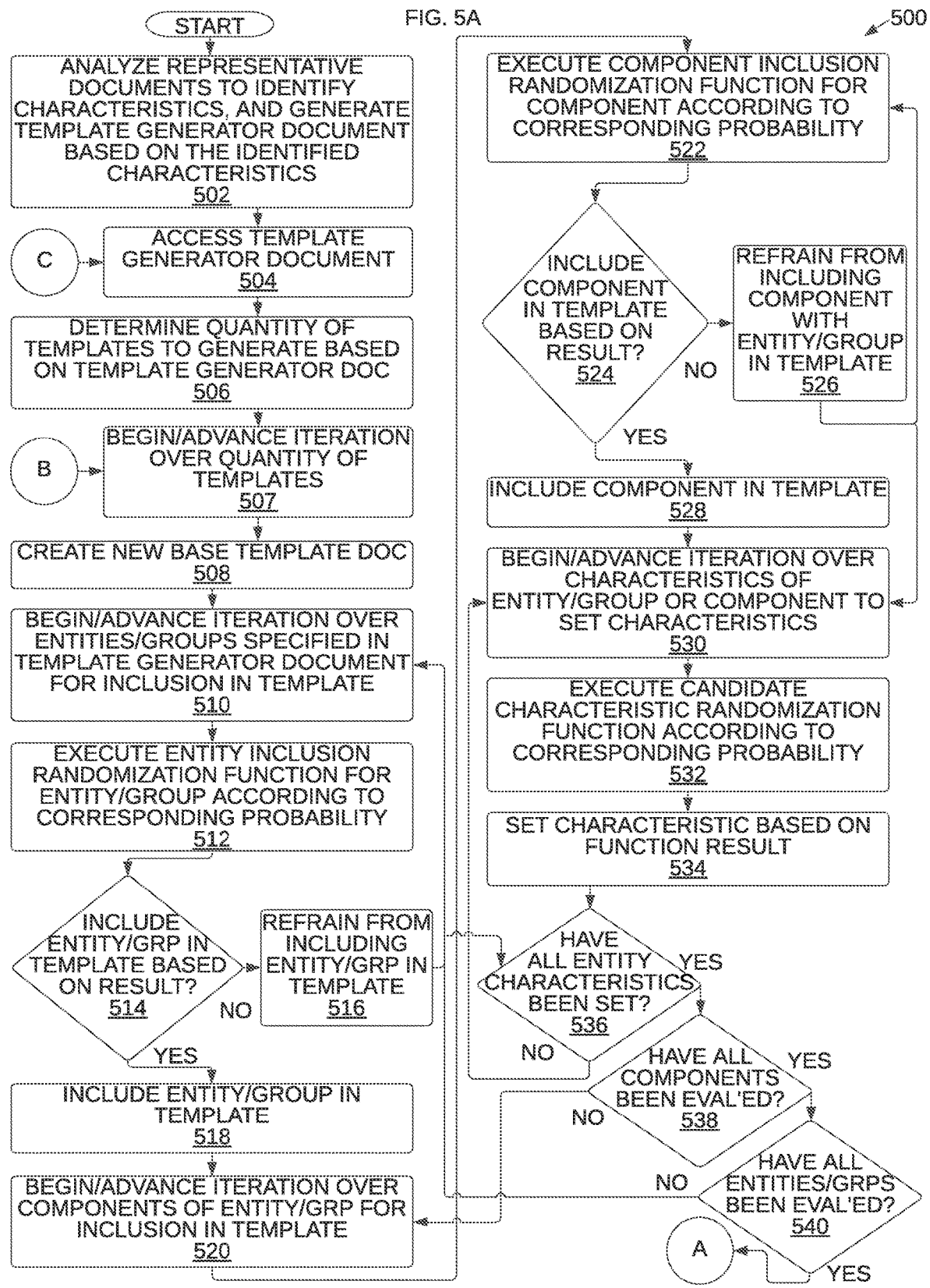
FIG. 4 shows a block diagram that illustrates a system in accordance with one or more embodiments.

FIG. 4 shows a block diagram that illustrates a system 400 in accordance with one or more embodiments. As illustrated in FIG. 4, system 400 includes a document processing system 410 communicatively coupled with a data repository 430, a document interface 402, an administrator interface 406, and an external data source 460. In one or more embodiments, the system 400 may include more or fewer components than the components illustrated in FIG. 4. The components illustrated in FIG. 4 may be local to or remote from each other. The components illustrated in FIG. 4 may be implemented in software and/or hardware. Each component of system 400 may be distributed over multiple applications and/or machines. Multiple components may be combined into one application and/or machine. Operations described with respect to one component may instead be performed by another component. Additional embodiments and/or examples relating to computer networks are described below.

While the examples described herein pertain to business documents used in the context of business activities involving business organizations, this should not be construed as limiting as the systems and methods described herein are also applicable to other examples not pertaining to businesses per se including, for example, government organizations, non-government organizations, non-profits, educational institutions, families, social groups, individual persons, and others. Thus, where the terms "business document" or "business organization" or similar are used herein, analogous terms applicable to one or more of government organizations, non-government organizations, non-profits, educational institutions, families, social groups, individual persons, or other non-business entities may be substituted in other examples, and all such examples are included within the scope of this disclosure.

Many business documents (e.g., invoices, receipts, purchase orders, etc.) are typically provided in a consistent structured format by a single business organization. However, various business organizations may use a different structured format for a similar type of document than other business organizations, even if their respective business documents include a same or similar type of information. In order to train machine learning (ML) models (e.g., for artificial intelligence (AI) systems) to recognize and extract desired information from various business documents without being specifically coded or configured to extract the desired information based on the specific business document formats that the ML models may encounter, the ML models may be trained using a large corpus of actual business documents and/or sample business documents including fictitious data that is formatted according to the standard formats that the ML models may encounter in processing actual business documents.

In some embodiments, a document processing system 410 includes a document characteristic identification engine 412. The document characteristic identification engine 412 may analyze one or more (e.g., a corpus of) source documents 432 to recognize and identify document characteristics 434 and statistical probabilities and probability distributions associated with the document characteristics 434. The document characteristic identification engine 412 may obtain the documents to analyze from the documents interface 402 and/or the scanner 404, external data source 460, and/or the data repository 430. The document characteristic identification engine 412 may use a set of rules to analyze the source documents 432. The document characteristic identification engine 412 may use the machine learning engine 424 to analyze the source documents 432.

In some embodiments, a document processing system 410 includes a template generator document creation engine 414. The template generator document creation engine 414 may create a template generator document 436 that is statistically representative of a group of source documents 432 analyzed and characterized by the document characteristic identification engine 412. The template generator document creation engine 414 may base creation of the template generator document 436 on the document characteristics 434 determined by the document characteristic identification engine 412 upon analyzing the group of source documents 432.

In some embodiments, a document processing system 410 includes a template document generation engine 416. The template document generation engine 416 may create template documents 438 based on a template generator document 436 by using a statistical function engine 422 to select values for components, variables and characteristics of entity groups and/or entities specified in a respective template generator document 436 according to respective probabilities specified therein.

In some embodiments, a document processing system 410 includes a dynamic virtual grid engine 418. The dynamic virtual grid engine 418 may be called upon during the generation of one or more template documents 438 based upon a template generator document 436 to fix coordinate positions of entity groups and/or entities, as statistically specified in the template generator document 436, on a page layout of the template documents 438.

Fixing the position of an entity group and/or entity within a section (e.g., header or top, body or middle, footer or bottom) on the page may be challenging for at least a number of reasons. First, writing entities and/or entity groups on a page while randomly setting their coordinate positions is not feasible for creating synthetic ML model training documents because there is a risk that the entities and/or entity groups may overlap. Overlapped entities and/or entity groups may be not only unrealistic and unrepresentative of source documents 432 that may be encountered in practice, but also may be unreadable, unusable, and ineffective in training the ML model 426. Also, when creating the template documents 438 to ultimately create the synthetic ML model training documents 440, the size (e.g., coordinate/spatial dimensions on the page) of each section of the documents being created is not known. If the section sizes were fixed at this stage, e.g., in a template generator document 436, a large amount of variability in the formats and layouts of the ultimately generated synthetic ML model training documents 440 may be forfeited. In addition, a structure of a document such as an invoice may be lost if the section sizes were fixed at this stage. Furthermore, although one may position each entity group sequentially in each section starting from the header to the footer, a large amount of variability in the formats and layouts of the ultimately generated synthetic ML model training documents 440 may be forfeited. The variability and variety in the corpus of synthetic ML model training documents 440 is one of the aspects which make them useful and advantageous for training of ML models. In addition, a structure of a document such as an invoice may be lost if each entity group were positioned serially in each section, e.g., starting from the header to the footer.

A method performed by the dynamic virtual grid engine 418 to solve the issues described above may start with fixing the size (e.g., dimensions) of each section of the template page (e.g., header or top, body or middle, and footer or bottom) as an N×M grid. For example, a footer section may be set to be a 3×3 grid. Subsequently, entity groups that include a "gridPosition" attribute may be assigned a position denoted by the "gridPosition" attribute. Then, for entity groups that may be required to be included in a specific section, e.g., according to the template generator document 436, a random position within the specific section may be assigned from the grid, while entity groups and positions having a "gridPosition" attribute set may be ignored. For example, after freezing the template (e.g., creating a particular template document 438 from a template generator document 436), the page footer of the template document 438 may include entity groups "Payment Terms" and "Invoice Details." The dynamic virtual grid engine 418 may assign a random grid position within the page footer section to each of the entity groups "Payment Terms" and "Invoice Details." The random position may be determined using one or more of the statistical function engine 422, probability distribution definitions 448, probabilistic function definitions 450, and probability specification for the entity group within the respective template generator document 436.

Then, training documents 440 may be generated based on a template document 438 by assigning values (e.g., dummy values that are selected based on specified statistics and/or characteristics in the respective template generator document 436) to the entities in the entity groups indicated in the template document 438. In an embodiment, an entity group may be first created in memory but not yet written to a document page canvas. The entities of this entity group in memory may be assigned the dummy values. For example, in an invoice document, an entity group "Invoice Details" may include dummy values for entities such as Invoice Number, Invoice Date, etc.

After having determined both the position that the entity group will be placed on the training document page (e.g., invoice page) and the dummy values for the entities included therein, a total amount of space (e.g., height and width) that the entity group will occupy in its row and column when written to the entity group's respective grid position in the training document page may be determined for each entity group. This information may be obtained using various APIs and tools, for example, image processing libraries such as PILLOW from PYTHON.

Subsequently, the size of each row and column of the document page grid may be adjusted based on the largest entity groups positioned in the respective row or column. For example, the largest entity group (e.g., the entity group that occupies the most space) in each row and column may control the size of each row and column. An entity group that occupies the most space vertically in a row may define the vertical size of the row. An entity group that occupies the most space horizontally in a column may define the horizontal size of the column. For example, a document section may be identified as having an N×M grid. The height of each row may be determined to be the maximum height of all entity groups within the respective row. The width of each row may be determined to be the sum of the widths of all entity groups within the respective row. The height of each column may be determined to be the sum of the heights of all entity groups in the respective column. The width of each column may be determined to be the maximum width of all entity groups in the respective column.

The dynamic virtual grid engine 418 may create a great amount of variability in placement of entity groups and/or entities within synthetic ML model training documents 440, while also maintaining adherence to standard and uniform layouts and structures that are applicable to the document type (e.g., invoices) of the synthetic ML model training documents 440 that the respective template generator document 436 is configured for synthesizing. For example, while the placement of entity groups such as MerchantDetails and ItemDetails may be greatly varied among synthetic ML model training documents 440 of an "invoice" document type that are synthesized based on a single exemplary template generator document 436, all these synthetic ML model training documents 440 of the "invoice" document type may maintain adherence to a uniform standard layout of placing a TotalDue entity in a lower right grid position.

In some embodiments, a document processing system 410 includes a synthetic document generation engine 420. The synthetic document generation engine 420 may generate synthetic ML model training documents 440 based on the template documents 438 and/or template generator documents 436 by replacing variables with dummy values according to the specification of the probability distribution (e.g., range from minimum to maximum values with a uniform distribution, or other probability distribution and parameters as may be specified) in the template documents 438 and/or template generator documents 436. The synthetic document generation engine 420 may utilize the statistical function engine 422 to set the dummy values according to the statistics specified by the template documents 438 and/or template generator documents 436.

In some embodiments, a document processing system 410 includes a statistical function engine 422. The statistical function engine 422 may generate random number values based on specified statistics, such as minimum and maximum values for a uniform distribution, mean and standard deviation for a normal distribution, etc. The statistical function engine 422 may determine and return statistical properties of a collection of data values provided to the statistical function engine 422 for analysis. The statistical function engine 422 may utilize data stored in the data repository 430 such as the probability distribution definitions 448 and probabilistic function definitions 450, for example. The statistical function engine 422 may be called by other components of the document processing system 410 to perform statistical functions.

For example, the document characteristic identification engine 412 may analyze a group of source documents 432 to determine characteristics thereof. The document characteristic identification engine 412 may provide data values corresponding to an entity in each of a group of source documents 432 to the statistical function engine 422 to determine statistical properties of the data values. The statistical function engine 422 may determine, for example, that the data values have a minimum value, a maximum value, and a uniform distribution, and report this statistical information to the document characteristic identification engine 412. The document characteristic identification engine 412 may record the determined statistical information returned by the statistical function engine 422 as document characteristics 434 for the analyzed group of source documents 432 so that the statistical information may be subsequently used in generating a respective template generator document 436.

In some embodiments, one or more components of the document processing system 410 use a machine learning (ML) engine 424. Machine learning includes various techniques in the field of artificial intelligence (AI) that deal with computer-implemented, user-independent processes for solving problems that have variable inputs. In some embodiments, data that is input into machine learning engine 424 is anonymized. Personal identifying information (PII) and other sensitive information (e.g., from the source documents 432) may be replaced with an anonymous identifier, such as a cryptographic hash of the user data. Machine learning engine 424 may use the anonymized data to learn patterns and make predictions for different documents, within the same or different organizations, having similar attributes without compromising or revealing sensitive data.

Machine learning engine 424 is operable to automatically infer patterns and data structures even though the exact pattern may not have been seen before. Further, machine learning engine 424 is operable to learn different patterns that qualify as structured data depending on context. Patterns and structured data may vary between different groups of source documents 432, such as between those of different types (e.g., invoices, statements of account, purchase orders, etc.) and those from different companies or different organizational departments within the same company.

In some embodiments, the machine learning engine 424 trains a machine learning model 426 to perform one or more operations. Training a machine learning model 426 uses training data to generate a function that, given one or more inputs to the machine learning model 426, computes a corresponding output. The output may correspond to a prediction, an interpretation of the one or more inputs, and/or a structured data extraction from the one or more inputs based on prior machine learning. In some embodiments, the output includes a label, classification, and/or categorization assigned to the provided input(s). The machine learning model 426 may be considered to improve when its decisions are less frequently overridden by a user of the document processing system 410. The machine learning model 426 corresponds to a learned model for performing the desired operation(s) (e.g., labeling, classifying, categorizing, and structured data extraction from inputs). A document processing system 410 may use multiple machine learning engines 424 and/or multiple machine learning models 426 for different purposes.

In some embodiments, the machine learning engine 424 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 424 receives positive and/or negative reinforcement in the process of attempting to solve a particular problem (e.g., to optimize performance in a particular scenario, according to one or more predefined performance criteria). In some embodiments, the machine learning engine 424 initially uses supervised learning to train the machine learning model 426 and then uses unsupervised learning to update the machine learning model 426 on an ongoing basis.

In some embodiments, a machine learning engine 424 may use many different techniques to label, classify, categorize, and/or extract structured data from inputs. A machine learning engine 424 may transform inputs into feature vectors that describe one or more properties ("features") of the inputs. The machine learning engine 424 may label, classify, categorize, and/or extract structured data from the inputs based on the feature vectors. Alternatively or additionally, a machine learning engine 424 may use clustering (also referred to as cluster analysis) to identify commonalities in the inputs. The machine learning engine 424 may group (i.e., cluster) the inputs based on those commonalities. The machine learning engine 424 may use hierarchical clustering, k-means clustering, and/or another clustering method or combination thereof. In some embodiments, a machine learning engine 424 includes an artificial neural network. An artificial neural network includes multiple nodes (also referred to as artificial neurons) and edges between nodes. Edges may be associated with corresponding weights that represent the strengths of connections between nodes, which the machine learning engine 424 adjusts as machine learning proceeds. Alternatively or additionally, a machine learning engine 424 may include a support vector machine. A support vector machine represents inputs as vectors. The machine learning engine 424 may label, classify, and/or categorize inputs based on the vectors. The coordinates of the vectors and corresponding boundaries between different hyperplanes may be adjusted as machine learning proceeds. Alternatively or additionally, the machine learning engine 424 may use a naïve Bayes classifier to label, classify, and/or categorize inputs. Alternatively or additionally, given a particular input, a machine learning engine 424 may apply a decision tree to predict an output for the given input. Alternatively or additionally, a machine learning engine 424 may apply fuzzy logic in situations where labeling, classifying, and/or categorizing an input among a fixed set of mutually exclusive options is impossible or impractical. Alternatively or additionally, a machine learning engine 424 may train a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. The aforementioned machine learning engine 424 and techniques are discussed for exemplary purposes only and should not be construed as limiting one or more embodiments.

A machine learning model 426 may include a recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing an entity, for example, may depend on its position within a sequence of feature vector representations. Thus, the nodes may have a memory to remember relevant temporal dependencies between different objects and/or activities. For example, an entity in isolation may have a first set of weights applied by nodes as a function of the respective feature vector for the expense. However, if the entity is immediately preceded by an earlier entity, then a different set of weights may be applied by one or more nodes based on the memory of the preceding entity. In this case, determining whether the second entity is . . . or may require a notification to the user requesting additional information, whereas such additional information may not be required if there were only one entity.

Candidate machine learning model weights and parameters (e.g., selected feature combinations used to form feature vectors) may be selected based on estimation error, for example, based on minimizing the estimation error. As another example, one or more nodes may apply different weights if an entity is unique or a duplicate of another entity on the same document. In this case, the trained machine learning model may automatically require user notification and additional information about duplicate entities. Additionally or alternatively, the machine learning model 426 may include other types of machine learning models, such as support vector machines, decision trees, Bayes classifiers, and/or fuzzy logic models.

In some embodiments, as a machine learning engine 424 applies different inputs to a machine learning model 426, the corresponding outputs are not always accurate. As an example, the machine learning engine 424 may use supervised learning to train a machine learning model 426. After training the machine learning model 426, if a subsequent input is identical to an input that was included in labeled training data and the output is identical to the supervisory signal in the training data, then output is certain to be accurate. If an input is different from inputs that were included in labeled training data, then the machine learning engine 424 may generate a corresponding output that is inaccurate or of uncertain accuracy. In addition to producing a particular output for a given input, the machine learning engine 424 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In some embodiments, the data repository 430 is any type of storage unit and/or device (e.g., a file system, database, collection of tables, or any other storage mechanism) for storing data. Further, a data repository 430 may include multiple different storage units and/or devices. The multiple different storage units and/or devices may or may not be of the same type or located at the same physical site. Further, a data repository 430 may be implemented or may execute on the same computing system as one or more other components of the system 400. Alternatively or additionally, a data repository 430 may be implemented or executed on a computing system separate from one or more other components of the system 400. A data repository 430 may be communicatively coupled to one or more other components of the system 400 via a direct connection or via a network.

In some embodiments, a data repository 430 is configured to store source documents 432. Source documents 432 may include any kind of documents representative of the documents the ML model 426 is to be trained to process and extract data from. Source documents 432 may include various types of business documents, for example, invoices, purchase orders, statements of account, etc. Source documents 432 may include any kind of documents that may be analyzed to determine document characteristics and statistics. Source documents 432 may include any kind of documents that may be analyzed to create a template generator document 436 upon which generating a large corpus of document templates and synthetic documents may be based, with the generated corpus having characteristics and statistics consistent with the source documents 432.

In some embodiments, a data repository 430 is configured to store document characteristics 434. Document characteristics 434 may include any kind of data that characterizes one or more aspects of any of the source documents 432. The document characteristics 434 may be statistically distilled from the full corpus or one or more subsets of the corpus of source documents 432, and/or may be indexed to specific documents included in the source documents 432. The document characteristics 434 may include lists and information regarding entity groups, entities included in the entity groups, components of the entities, and various other characteristics. The document characteristics 434 may include fonts, font sizes, font colors, page placement of data (e.g., entity groups, entities, components, or other data) in referenced documents, formatting of data, and/or any other kind of data or combination thereof associated with the source documents 432.

In some embodiments, a data repository 430 is configured to store one or more template generator documents 436. A template generator document 436 may be generated by the document processing system 410 to control generation of a large corpus of template documents 438 and synthetic documents may be based on at least a portion of the source documents 432, with the generated corpus having characteristics and statistics consistent with the source documents 432 upon which the template generator document 436 was created to represent.

In some embodiments, a data repository 430 is configured to store one or more template documents 438. The template documents 438 may be generated by the document processing system 410 according to one or more template generator documents 436. The template documents 438 may be generated to include entity groups, entities, components, and characteristics based on one or more template generator documents 436, while including variables and specified probabilities in place of actual values that a source document 432 may include.

In some embodiments, a data repository 430 is configured to store one or more synthetic ML model training documents 440. A synthetic ML model training document 440 may be generated by the document processing system 410 based on a template generator document 436 to represent a source document 432, while having simulated or "dummy" values (e.g., the randomized values described herein) instead of actual values from a source document 432, for training the ML model 426. A corpus of synthetic ML model training documents 440 may collectively have statistical characteristics that are analogous to or consistent with statistical characteristics of a corresponding corpus of source documents 432 that the corpus of synthetic ML model training documents 440 are generated to represent, according to the template generator document 436 upon which their creation was based.

The synthetic ML model training documents 440 may include, for example, (a) images of a variety of formats and layouts of documents such as invoices, purchase orders, receipts, statements of account, etc., which can be used to train the ML model 426, and (b) corresponding annotations that include labels for identifying and processing particular data items shown in the images of the documents. In some embodiments, examples in the synthetic ML model training documents 440 include multiple documents that are related. For example, one example training corpus may include a set of synthetic ML model training documents 440 that represent invoices, another example training corpus may include a set of synthetic ML model training documents 440 that represent purchase orders, etc. In this instance, the expenses and activities may be related (a); (b); and (c). The synthetic ML model training documents 440 may include various other information about the documents to aid in training the ML model 426 for real world applications.

In some embodiments, a data repository 430 is configured to store entity group definitions 442. The entity group definitions 442 may include definitions of entity groups that may be recognized and identified in a corpus of source documents 432 by the document processing system 410 and created in the corpus of synthetic ML model training documents 440 to represent. In some embodiments, the entity group definitions 442 may be specified using JSON. In some embodiments, the entity group definitions 442 may be represented in a relational database.

In some embodiments, a data repository 430 is configured to store one or more entity definitions 444. The entity definitions 444 may include definitions of entities that may be recognized and identified in a corpus of source documents 432 by the document processing system 410 and created in the corpus of synthetic ML model training documents 440 to represent. In some embodiments, the entity definitions 444 may be specified using JSON. In some embodiments, the entity definitions 444 may be represented in a relational database.

In some embodiments, a data repository 430 is configured to store one or more component definitions 446. The component definitions 446 may include definitions of components that may be recognized and identified in a corpus of source documents 432 by the document processing system 410 and created in the corpus of synthetic ML model training documents 440 to represent. In some embodiments, the component definitions 446 may be specified using JSON. In some embodiments, the component definitions 446 may be represented in a relational database.

In some embodiments, a data repository 430 is configured to store one or more probability distribution definitions 448. The probability distribution definitions 448 may include definitions of probability distributions that may apply to various source document characteristics and values, and which may be used to specify how the document processing system 410 should generate statistical values for corresponding template generator document values when creating a corpus of synthetic ML model training documents 440. The probability distributions represented by the probability distribution definitions 448 may be recognized and identified in a corpus of source documents 432 by the document processing system 410, and the probability distribution definitions 448 may facilitate the template generator documents 436 to represent the probability distributions recognized in the corpus of source documents 432 so that a corpus of synthetic ML model training documents 440 created based upon a template generator document 436 may exhibit the same probability distributions as the corresponding source documents 432. In some embodiments, the probability distribution definitions 448 may be specified using JSON. In some embodiments, the probability distribution definitions 448 may be represented in a relational database.

In some embodiments, a data repository 430 is configured to store one or more probability function definitions 450. The probability function definitions 450 may include definitions and/or specifications of probability functions that may be executed to create dummy or randomized values that exhibit desired probability distributions as defined in the probability distribution definitions 448. The probability functions defined by the probability function definitions 450 may be used by the document processing system 410 to generate statistical values (e.g., dummy or randomized values) for corresponding entity groups, entities, and components specified in a template generator document 436 when generating template documents 438, or specified in a template document 438 when creating synthetic ML model training documents 440. Thus, the probability functions defined by the probability function definitions 450 may facilitate the template generator documents 436 to represent the probability distributions recognized in the corpus of source documents 432 so that the system 400 may create a corpus of synthetic ML model training documents 440 that exhibit the same probability distributions as the corresponding source documents 432 which the template generator documents 436 were created to represent. In some embodiments, the probability function definitions 450 may be specified using JSON. In some embodiments, the probability function definitions 450 may be represented in a relational database.

In some embodiments, a data repository 430 is configured to store one or more user credentials 452. The document processing system 410 may use a user credential 452 to facilitate access by a user (e.g., an administrator) to the document processing system (e.g., via the administrator interface 406). The document processing system 410 may use a user credential 452 to access an external data source 460 and obtain data (e.g., one or more source documents 432) from the external data source 460. A user credential 452 may include a username, user identifier (ID), password, private key, public key, and/or any other kind of credential or combination thereof. In some embodiments, a user supplies a user credential 452 to the document processing system 410 via a graphical user interface. For example, the document processing system 410 may use three-party authentication to obtain a user credential 452 from a user. A user credential 452 may be obtained from a user via the administrator interface 406.

Information describing one or more components that are illustrated here within a data repository 430 may be implemented across any of components within the system 400. However, this information is illustrated within the data repository 430 for purposes of clarity and explanation.

In some embodiments, the document processing system 410 is configured to receive data from one or more external data sources 460. An external data source 460 may refer to hardware and/or software operating independent of the document processing system 410, e.g., under control of a different entity (e.g., a different company or other kind of organization) than an entity that controls the document processing system 410. An external data source 460 may supply data associated with documents, such as invoices, purchase orders, statements of account, and/or any other kind of documents that may be processed to extract data therefrom.

In some embodiments, a document processing system 410 is configured to retrieve data from an external data source 460 by 'pulling' the data via an application programming interface (API) of the external data source 460, using user credentials 452 that a user has provided for that particular external data source 460. Alternatively or additionally, an external data source 460 may be configured to 'push' data to the document synthesizer via an API of the document synthesizer, using an access key, password, and/or other kind of credential that a user has supplied to the external data source 460. Alternatively or additionally, an external data source 460 may be configured to access data from an additional external data source to provide to the document processing system 410 via an API of the external data source 460, using an access key, password, and/or other kind of credential that a user has supplied to the external data source 460. A document processing system 410 may be configured to receive data from an external data source 460 in many different ways.

In some embodiments, one or more components of the system 400 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

4. Generating Template Documents and Synthetic ML Model Training Documents

In some embodiments, the document processing system 410 generates synthetic documents for training a ML model based on document template data. The document template data may be based on a statistical analysis of source documents, as embodied in a template generator document, and/or feedback from use of the ML model. Machine learning facilitates performing tasks and capturing patterns (e.g., capturing structured data from input documents that do not conform to a predetermined structure or format) that are not hard-coded or otherwise explicitly programmed into the system. Machine learning further facilitates adaptations to different application use-cases and evolutions over time without requiring complex reprograming or other changes in the underlying application code.

Randomization is utilized to statistically represent the diverse source documents 432 in the template generator document 436 for subsequent preparations of a corpus of template documents 438 and synthetic ML model training documents 440. A freezing process is utilized in the methodology and operations described herein to generate a large corpus of synthetic ML model training documents 440 having similar statistical characteristics as the original analyzed diverse source documents 432 for training the ML model 426. The freezing process is utilized to create a template document 438 based on a template generator document 436 such that "frozen" features and characteristics represented in the template document 438 may be passed on to each synthetic ML model training document 440 that is generated based on the template document 438. While the template generator document 436 represents the randomness of the originally analyzed group of source documents 432, the methodology to generate the corpus of synthetic ML model training documents 440 based on the template generator document 436 utilizes the freezing process to assign specific dummy or randomized values to certain random variables according to their probability distributions (e.g., a default distribution or as specified in the template generator document 436) when creating template documents 438. Placement, positioning, and characteristics of entity groups, entities, and components may be "frozen" in the template documents 438 while the template documents 438 may continue to include some statistical variables to later be assigned specific dummy or randomize values when each individual synthetic ML model training document 440 in the corpus of synthetic ML model training documents 440 is generated from the corresponding template document 438.

| Randomization | Freezing Process |
| --- | --- |
| Probability-based randomization for choosing a section for entity group | Note that the "position" key in the template generator document may define the probabilities of an entity group to be included in each section of an output training document instance. (Some embodiments may facilitate the probability distribution to be specified in the template generator document.)<br>To freeze the section in which an entity group is presented in an output training document instance on the basis of these probabilities, the choices function from random library may be used.<br>The choices function may be provided weights for each value which are taken from the probabilities specified for each section. |
| Placing an entity group in a particular section of the output training document page instance | Driven by the "Dynamic Virtual Grid Method" described below. |
| Probability-based tabulation for an entity group | A random number may be generated from a uniform distribution. (Some embodiments may facilitate the probability distribution to be specified in the template generator document.) If the generated number is less than the specified tabulation probability, the entity group may be created as a table. For determining whether to generate a horizontal or vertical table, a random value may be selected from the choices specified in the template generator document. |
| Choosing an entity group header | Pick an entity group header value randomly from the list of headers provided in the template generator document. (Some embodiments may facilitate the probability distribution to be specified in the template generator document.) |
| Probability-based randomization for entities to be included in an instance of the entity group | Generate a random number from a uniform distribution. (Some embodiments may facilitate the probability distribution to be specified in the template generator document.) If the number is less than the entity probability specified in the template generator document, the entity may be made available in the instance of the entity group in the output training document. |
| Choosing an entity header | Pick a value randomly from the list of headers provided in the template generator document for each entity. (Some embodiments may facilitate the probability distribution to be specified in the template generator document.) |
| Shuffling entities in sub-groups | The original indices of elements in each shuffle sub-group may be identified. Then the original indices may be shuffled to arrive at new indices. Then the new indices may be assigned to the original entities in this sub-group. |
| Probability-based randomization for entity group headers to be included in the entity group instance | A random number may be generated from a uniform distribution. (Some embodiments may facilitate the probability distribution to be specified in the template generator document.) If the generated number is less than the specified entity group header probability, the entity group header may be made available in the entity group instance in the output training document. |
| Probability-based randomization for entity group to be included in the output training document instance | A random number may be generated from a uniform distribution. (Some embodiments may facilitate the probability distribution to be specified in the template generator document.) If the number is less than the entity group probability, the entity group may be made available in the output training document instance. |
| Global font face and color choice | A font face and color for each entity, entity header, and entity group header may be chosen for the entire output training document instance, from a list of available fonts in the project directory. |
| Table attributes | Attributes for the tables, e.g., header font color/face, row font color/face, number of rows, col/row separator style, etc., may also be chosen randomly for all the tables in the output training document instance. (Some embodiments may facilitate the probability distribution to be specified in the template generator document.) |
| Global entity header choice | A configured probability may define whether all the entities in the output training document should have entity headers. A random number may be generated from a uniform distribution. (Some embodiments may facilitate the probability distribution to be specified in the template generator document.) If the number is less than this configured probability, the entities may be determined to include entity headers; otherwise, not.<br>Note that as described in the template section, the entities in the template generator document may be set to strictly include headers even if a global configuration is set to not include entity headers.<br>For example, some entities such as "Tax ID", "Total Amount", etc. may be specifically set to include an entity header to facilitate interpretation of their value by a reader of the generated training document, regardless of a global configuration to not include entity headers. |
| Choosing entity alignment | Pick an alignment value randomly from the list provided for the entity. (Some embodiments may facilitate the probability distribution to be specified in the template generator document.) |

Figure 5:
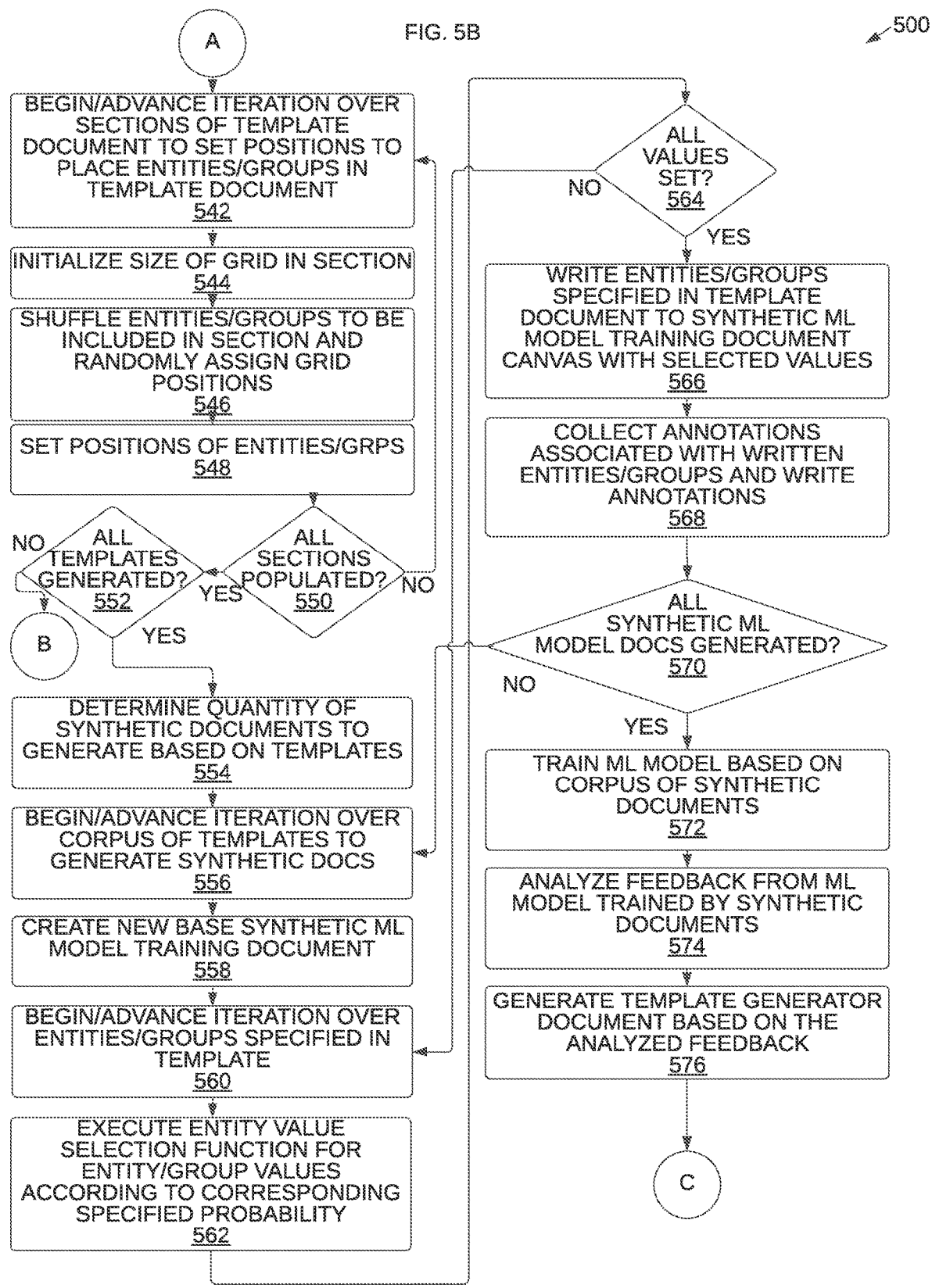
FIGS. 5A and 5B show a block diagram that illustrates an example set of operations for generating a template document and synthetic ML model training documents in accordance with one or more embodiments.

FIGS. 5A and 5B show a block diagram that illustrates an example set of operations 500 for generating a template document 438 and synthetic ML model training documents 440 in accordance with one or more embodiments. Generating the template document 438 and synthetic ML model training documents 440 may be performed by the document processing system 410 based on a template generator document 436. One or more operations illustrated in FIGS. 5A and 5B may be modified, rearranged, or omitted altogether. Accordingly, the particular sequence of operations illustrated in FIGS. 5A and 5B should not be construed as limiting the scope of one or more embodiments. The operations 500 may utilize patterns and randomness observed in a large dataset of analyzed business documents upon which a template generator document 436 is based to generate template documents 438 to appropriately apply random variables to synthesize a large corpus (e.g., thousands, hundreds of thousands, or millions, etc.) of unique, labelled document images (e.g., synthetic ML model training documents 440) for training ML models 426 using various tools such as optical character recognition (OCR), key-value extraction, table detection, etc. The corpus of unique, labelled document images may exhibit characteristics that statistically vary from one another in a manner analogous to the original dataset of analyzed source documents 432 upon which the template generator document 436 is based.

Source documents 432 representative of the types of documents that are planned to be input into a ML model 426 to be read and interpreted may be analyzed to identify document characteristics 434, and a template generator document 436 may be generated to be statistically representative of the source documents 432 based on the identified document characteristics 434 (Operation 502). For example, the source documents 432 may be input by a user via document interface 402 and/or scanner 404, obtained from an external data source 460 (e.g., using user credentials 452), and/or stored in the data repository 430. Exemplary types of documents may be invoices, purchase orders, statements of account, or other documents having data that may be read and input into a database. The analysis may include executing the document characteristic identification engine 412, optionally utilizing the statistical function engine 422 and/or the machine learning engine 424. The document characteristics 434 may include lists or ranges of possible entity groups, entities, page positions, components, characteristics, values, and probabilities. The probabilities may be specified as a minimum value, maximum value, and uniform distribution, or as other probability distributions with associated parameters. Results of the analysis, e.g., document characteristics 434, may be stored in the data repository 430.

The template generator document 436 may be accessed (Operation 504), for example, from the data repository 430, from an external data source 460, from a document interface 402, or from an administrator interface 406. A quantity of template documents 438 to generate based on the template generator document 436 may be determined (Operation 506). The determination may be made, for example, on the basis of a default setting or a preferences setting of the document processing system 410, a user input via a graphical user interface or document interface 402, an administrator input via the administrator interface 406, a quantity of source documents 432 analyzed to generate the template generator document 436, an extent of statistical variations detected in the source documents 432 and/or stored in the document characteristics 434, a quantity of entity groups and/or entities included in the template generator document 436, a quantity of random values to be assigned based on the template generator document 436, or other basis. Given the quantity of template documents 438 to generate that is determined in Operation 506, iterations over an index value of a current template document 438 being generated may begin and may be advanced (Operation 507) to repeatedly loop through a sequence of operations until the determined quantity of template documents 438 is generated.

A new base template document 438 may be created and initialized for each of the determined quantity of template documents 438 to be generated (Operation 508). The base template document 438 may include a minimal amount of data and content as a foundation that will be built upon by the addition of entity groups, entities, and/or components as specified in the template generator document 436 accessed in Operation 504 for the current template document iteration begun in Operation 507. The base template document 438 created in Operation 508 may include the same data and content for each of the quantity of template documents 438 determined to be generated in Operation 506. As the base template document 438 is built upon through the subsequent operations illustrated in FIGS. 5A-5B and discussed herein (beginning with Operation 510 discussed below), the base template document 438 may become a completed template document 438 corresponding to one of the quantity of templates determined to be generated in Operation 506. The base template document 438 may include an image file, a text file, a word processing file, a portable document format (PDF) file, and/or template document 438 data stored in the data repository 430. The base template document 438 may include a blank image of the document type (e.g., invoice, purchase order, receipt, statement of account, etc.). The base template document 438 may include annotations of information regarding entity groups and/or entities written to the template document 438, for example, stored in a text file.

Iterations over an index value of a current entity group and/or entity specified in the template generator document 436 may begin and may be advanced (Operation 510) to repeatedly loop through a sequence of operations until all entity groups and/or entities specified in the template generator document 436 have been considered and processed for inclusion in the current template document 438 being generated.

An entity inclusion randomization function may be executed (Operation 512) for the entity group and/or entity currently being considered for inclusion in the current template document 438 being generated. The entity inclusion randomization function may be executed according to a corresponding probability specification included in the template generator document 436. The execution of the randomization function may include executing the statistical function engine 422. The execution of the randomization function may be performed with data from the probability distribution definitions 448 and/or probabilistic function definitions 450. The execution of the randomization function may be performed according to respective parameters and conditions specified in the template generator document 436 with respect to the currently considered entity group and/or entity.

Whether the currently considered entity group and/or entity is to be included in the current template document 438 being generated may be determined (Operation 514) based on the result of the randomization function executed in Operation 512. For example, if a result is greater than a specified threshold, the currently considered entity group and/or entity may be included, or vice-versa. If the currently considered entity group and/or entity is determined to not be included, the currently considered entity group and/or entity may be refrained from being included (Operation 516) and the method may proceed to Operation 510 to consider another of the entity groups and/or entities specified in the template generator document 436. If there are no more entity groups and/or entities remaining to be considered to be included, the method may proceed to Operation 536 instead. If the currently considered entity group and/or entity is determined to be included, the currently considered entity group and/or entity may be included in the template document 438 (Operation 518). In this case, a data structure and/or entry in the data repository 430 (e.g., associated with the template document 438 being currently generated) may be created and/or stored for use in completing the inclusion and writing of the currently considered entity group and/or entity in the template document 438.

Iterations over an index value of a current component of the currently considered entity group and/or entity, as specified in the template generator document 436, may begin and may be advanced (Operation 520) to repeatedly loop through a sequence of operations until all components of the currently considered entity group and/or entity as specified in the template generator document 436 have been considered and processed for inclusion in the current template document 438 being generated.

A component inclusion randomization function may be executed (Operation 522) for the component currently being considered for inclusion in the current template document 438 being generated. The component inclusion randomization function may be executed according to a corresponding probability specification included in the template generator document 436. The execution of the randomization function may include executing the statistical function engine 422. The execution of the randomization function may be performed with data from the probability distribution definitions 448 and/or probabilistic function definitions 450. The execution of the randomization function may be performed according to respective parameters and conditions specified in the template generator document 436 with respect to the currently considered component.

Whether the currently considered component is to be included in the current template document 438 being generated may be determined (Operation 524) based on the result of the randomization function executed in Operation 522. For example, if a result is greater than a specified threshold, the currently considered component may be included, or vice-versa. If the currently considered component is determined to not be included, the currently considered component may be refrained from being included (Operation 526) and the method may proceed to Operation 522 to consider another of the components specified in the template generator document 436. If there are no more components of the currently considered entity group and/or entity remaining to be considered to be included, the method may proceed to Operation 530 instead. If the currently considered component is determined to be included at Operation 524, the currently considered component may be included in the template document 438 (Operation 528). In this case, a data structure and/or entry in the data repository 430 (e.g., associated with the template document 438 being currently generated) may be created and/or stored for use in completing the inclusion and writing of the currently considered component in the template document 438.

Iterations over an index value of a current characteristic of the currently considered entity group, entity, and/or component as specified in the template generator document 436, may begin and may be advanced (Operation 530) to repeatedly loop through a sequence of operations until all characteristics of the currently considered entity group, entity, and/or component as specified in the template generator document 436 have been considered and processed for inclusion in the current template document 438 being generated.

A candidate characteristic randomization function may be executed (Operation 532) for the characteristic currently being considered for inclusion in the current template document 438 being generated. The candidate characteristic randomization function may be executed according to a corresponding probability specification included in the template generator document 436. The execution of the randomization function may include executing the statistical function engine 422. The execution of the randomization function may be performed with data from the probability distribution definitions 448 and/or probabilistic function definitions 450. The execution of the randomization function may be performed according to respective parameters and conditions specified in the template generator document 436 with respect to the currently considered characteristic.

If not all characteristics of the currently considered entity group, entity, and/or component have been determined to be considered and set (Operation 536), the method may return to Operation 530 to continue the iterations over characteristics. Otherwise, if not all components of the currently considered entity group and/or entity have been determined to be considered and evaluated (Operation 538), the method may return to Operation 520 to continue the iterations over components. Otherwise, if not all entity groups and/or entities have been determined to be considered and evaluated (Operation 540), the method may return to Operation 510 to continue the iterations over entity groups and/or entities specified in the template generator document 436.

If all entity groups and/or entities have been determined to be considered and evaluated, the method may proceed to begin/advance iterations over sections of a template document canvas of the template document 438 currently being created (Operation 542), to repeatedly loop through a sequence of operations to set positions to place all included entity groups and/or entities in the template document canvas.

An N×M grid may be established and initialized in the section (Operation 544). The dimensions N and M may be determined at least in part by defaults or preferences set in the document processing system 410. The dimensions may be determined at least in part according to a user's settings. The dimensions may be determined at least in part by dimensions of one or more entity groups and/or entities that are configured to or assigned to be included in the section. For example, an entity group and/or entity that occupies the most space vertically in a row may define the vertical size of the row. An entity group and/or entity that occupies the most space horizontally in a column may define the horizontal size of the column. The height of each row may be determined to be the maximum height of all entity groups and/or entities within the respective row. The width of each row may be determined to be the sum of the widths of all entity groups and/or entities within the respective row. The height of each column may be determined to be the sum of the heights of all entity groups and/or entities in the respective column. The width of each column may be determined to be the maximum width of all entity groups and/or entities in the respective column.

Entity groups and/or entities to be included in the section may be shuffled and randomly assigned grid positions (Operation 546). The randomly assigned grid positions may be determined using one or more of the statistical function engine 422, probability distribution definitions 448, probabilistic function definitions 450, and probability specification for the entity group and/or entity within the respective template generator document 436. In the event that one or more entity groups or entities have fixed positions defined, the remaining entity groups and/or entities to be included in the section may be shuffled and randomly assigned grid positions that do not conflict with the positions already occupied by the entity groups and/or entities that have fixed positions defined.

The positions of the entity groups and/or entities may then be set (Operation 548). The entity groups and/or entities to which positions are to be assigned in the current section may be considered in turn. For the starting x,y coordinates for each entity group and/or entity, the x-coordinate may be set according to the sum of the widths of all columns before (e.g., to the left of) the current entity group and/or entity, and the y-coordinate may be set according to the sum of the heights of all rows before (e.g., above) the current entity group and/or entity. If the entity group to be placed is a type of table, a PILLOW function from a PYTHON image processing library, or the like, may be used to write the table to the template document 438 based on the entity group's x,y coordinate. The PILLOW image processing library may be operable to write text, using different fonts, at different sizes, in different colors, in the form of a stack and/or table, creating shape structures such as lines, and/or superimposing other images (e.g., logos, product images, bank check images, receipt images, etc.) onto the canvas. While the position of an entity group is being set, a position of each entity within the entity group may also be correspondingly set by looping over the entities within the entity group. For example, the first entity within an entity group may be positioned with the x,y coordinate of the entity group overall. To set the positions of the entities within an entity group and write them as text on the template document canvas, a PILLOW function from a PYTHON image processing library, or the like, may be used to write the text, and an annotation of the written text may be obtained. The annotation may be entered into the associated annotation file as discussed elsewhere herein. After writing the current entity to the template document canvas, in a stack-type entity group, a y-coordinate for the next entity of the current entity group not yet written to the template document canvas may be updated. The y-coordinate may be set as the height of the last entity plus an intra-group-spacing between entities within the same stack-type entity group. Once all entity groups and/or entities have been written to the template document canvas, all the annotations of all the written entity groups and/or entities may be collated for inclusion in a text file separate from the template document canvas.

If not all sections of the template document 438 have been populated with relevant entity groups and/or entities (Operation 550), the method may return to Operation 542 to continue the iterations over sections of the template document 438. Otherwise, if not all intended template documents 438 have been generated (Operation 552), the method may return to Operation 507 to continue the iterations over the determined quantity of template documents 438 to generate.

Once all of the determined quantity of template documents 438 have been generated, a quantity of synthetic ML model training documents 440 to generate based on the generated template documents 438 may be determined (Operation 554). The determination may be made, for example, on the basis of a default setting or a preferences setting of the document processing system 410, a user input via a graphical user interface or document interface 402, an administrator input via the administrator interface 406, a quantity of source documents 432 analyzed to generate the template generator document 436, an extent of statistical variations detected in the source documents 432 and/or stored in the document characteristics 434, a quantity of template documents 438 generated, a quantity of entity groups and/or entities included in the template documents 438, a quantity of random values to be assigned based on the template documents 438, or other basis. Given the quantity of synthetic ML model training documents 440 to generate that is determined in Operation 554, iterations over index values of a current template document 438 over the corpus of generated template documents 438 and of a currently generated synthetic ML model training document 440 over the corpus of synthetic ML model training documents 440 may begin and may be advanced (Operation 556) to repeatedly loop through a sequence of operations until the determined quantity of synthetic ML model training documents 440 is generated. A quantity of synthetic ML model training documents 440 generated per template document 438 may be one or more than one, and may depend on numerous factors (e.g., a default setting or a preferences setting of the document processing system 410, a user input via a graphical user interface or document interface 402, an administrator input via the administrator interface 406, a quantity of source documents 432 analyzed to generate the template generator document 436, an extent of statistical variations detected in the source documents 432 and/or stored in the document characteristics 434, a quantity of entity groups and/or entities included in the template generator document 436, a quantity of random values to be assigned based on the template generator document 436, or other basis). Therefore, the maximum index number of the current template document 438 over the corpus of template documents 438 generated for the template generator document 436 may be smaller than the maximum index number of the currently generated synthetic ML model training document 440 over the corpus of synthetic ML model training documents 440 generated for the template generator document 436.

A new base synthetic ML model training document 440 may be created and initialized for each of the determined quantity of synthetic ML model training documents 440 to be generated (Operation 558). The base synthetic ML model training document 440 may include a minimal amount of data and content as a foundation that will be built upon by the addition of entity groups, entities, and/or components as specified in the template document 438 corresponding to the current template corpus iteration begun in Operation 556. The base synthetic ML model training document 440 created in Operation 558 may include the same data and content for each of multiple synthetic ML model training documents 440 in examples that may create multiple synthetic ML model training documents 440 for each template document 438. As the base synthetic ML model training documents 440 is built upon through the subsequent operations illustrated in FIG. 5B and discussed herein (beginning with Operation 560 discussed below), the base synthetic ML model training document 440 may become a completed synthetic ML model training documents 440 corresponding to one of the quantity of synthetic ML model training documents 440 determined to be generated in Operation 554. The base synthetic ML model training document 440 may include an image file, a text file, a word processing file, a portable document format (PDF) file, and/or synthetic ML model training document 440 data stored in the data repository 430. The base synthetic ML model training document

440 may include a blank image of the document type (e.g., invoice, purchase order, receipt, statement of account, etc.) as a canvas to be written to. The base synthetic ML model training document 440 may include annotations of information regarding entity groups and/or entities written to the synthetic ML model training document 440, for example, stored in a text file.

Iterations over an index value of a current entity group and/or entity specified in the synthetic ML model training document 440 may begin and may be advanced (Operation 560) to repeatedly loop through a sequence of operations until all entity groups and/or entities specified in the template document 438 have been processed for setting values and writing to the current synthetic ML model training document 440 being generated.

An entity value selection function may be executed (Operation 562) for the entity group and/or entity currently being considered for setting values and writing to the current synthetic ML model training document 440 being generated. The entity value selection function may be executed according to a corresponding probability specification included in the current template document 438 and/or template generator document 436. The execution of the entity value selection function may include executing the statistical function engine 422. The execution of the entity value selection function may include executing a PYTHON library FAKER to generate dummy values based on the specified type of entity (e.g., text string, date, currency, integer or floating point number), statistics and/or probabilities. The execution of the entity value selection function may include performing custom logic based on the entity group and/or entity type, for example, based on results of analyzing value patterns in the source documents 432 upon which the template document 438 and/or template generator document 436 is based. The execution of the entity value selection function may be performed with data from the probability distribution definitions 448 and/or probabilistic function definitions 450. The execution of the entity value selection function may be performed according to respective parameters and conditions specified in the current template document 438 and/or template generator document 436 with respect to the currently considered entity group and/or entity.

If not all entity group and/or entity values (e.g., including component and characteristics values as well as probabilistic variable or parameter values) of the template document 438 have been set (Operation 564), the method may return to Operation 560 to continue the iterations over the entity groups and/or entities specified in the template document 438.

Entity groups and/or entities specified in the template document 438 may be written to the synthetic ML model training document 440 and/or the associated synthetic ML model training document image canvas using the selected values determined in Operation 562 at the coordinate positions specified in the template document 438 (Operation 566). Writing the entity groups and/or entities may include performing a PILLOW function from a PYTHON image processing library, or the like. The PILLOW image processing library may be used to write an individual entity, a stack of entities, or a table of entities, and their respective values, to the synthetic ML model training document image canvas based on their respective coordinates as set in Operation 548. The PILLOW image processing library may be operable to write text, using different fonts, at different sizes, in different colors, in the form of a stack and/or table, creating shape structures such as lines, and/or superimposing other images (e.g., logos, product images, bank check images, receipt images, etc.) onto the canvas.

Writing the entity groups and/or entities specified in the template document 438 to the synthetic ML model training document 440 and/or the associated synthetic ML model training document image canvas may include ensuring that the rules and guidelines associated with the dynamic virtual grid (described above) are adhered to. For example, entity groups and/or entities may be ensured to not overlap on the canvas, entity groups and/or entities may be written according to the specified structure, format, and layout (e.g., in a table, in a stack, left-aligned, right-aligned, centered, having specified margins, etc.). The size of each row and column in the grid being written to the canvas may be estimated, and the entity groups and/or entities specified to be written in each row or column of the grid may be aligned as specified based on the largest entity group and/or entity within the respective row or column. Sufficient gaps between entity groups and/or entities written to the canvas may be ensured, for example, through configured offset values (e.g., hard-coded in the document processing system 410, configured as default or user-specified preference parameters, defined in the template generator document 436 and/or template document 438, etc.).

Annotations associated with the entity groups and/or entities written to the synthetic ML model training document 440 and/or synthetic ML model training document canvas may be produced, collected, and/or written to an annotations file (Operation 568). The annotations collected and written to the annotations file may include those collated for the template document 438 in Operation 548. Production of the annotations may include determining an amount of space that text and/or bounding boxes associated with each of the annotations may occupy on the synthetic ML model training document canvas. Annotations may be positioned on the synthetic ML model training document canvas relative to their associated entity groups and/or entities such that the annotations do not overlap or obscure other annotations, entity groups and/or entries also written to the synthetic ML model training document canvas. Annotation information written to the annotations file may include an identification of their associated entity group and/or entities, a label name (e.g., Merchant Name, Invoice Total, etc.) of their associated entity group and/or entities, text content to be written on the synthetic ML model training document canvas, coordinate positions of the text content on the canvas, and coordinate positions of associated bounding box(es) on the canvas.

If not all intended synthetic ML model training documents 440 have been generated (Operation 570), the method may return to Operation 556 to continue the iterations over the determined quantity of synthetic ML model training documents 440 to generate.

The corpus of synthetic ML model training documents 440 may be input into the ML engine 424 to train the ML model 426 (Operation 572). The synthetic ML model training documents 440 input to the ML engine 424 to train the ML model 426 may include the associated synthetic ML model training document canvases and/or the associated synthetic ML model training document annotations.

Feedback from the ML model 426 based on the training with the synthetic ML model training documents 440 may analyzed, for example, to determine an error rate, accuracy level, and/or user satisfaction with the results of training and/or using the ML model 426 on the intended real-world documents (Operation 574). User satisfaction, for example, may be input to the document processing system 410 via a graphical user interface, document interface 402, administrator interface 406, and/or external data source 460. The user may be queried by the document processing system 410 about whether the user wishes to override the ML model 426's interpretation and data extraction from a synthetic ML model training document 440 and/or a real-world document. The user may provide feedback to the document processing system 410 in response to this query.

A new and/or revised template generator document 436 may be generated based on the analyzed feedback from Operation 574 (Operation 576). In some embodiments, the user's implicit approval of the ML model 426's interpretation and processing of the synthetic ML model training document 440 or real-world document, by not overriding it, may reinforce the ML model 426's decision-making processes. In some embodiments, if the user decides to override the ML model 426's interpretation and processing of the synthetic ML model training document 440 or real-world document, the ML model 426 may be updated based on the user's request to override the ML model 426's interpretation and processing, specifically, via generation of the new and/or revised template generator document 436, subsequent generation of new and/or revised synthetic ML model training documents 440, and training of the ML model 426 using the new and/or revised synthetic ML model training documents 440. In this way, the ML model 426's performance may be trained in an ongoing basis to make decisions, interpret documents, and extract data from the documents with greater and greater accuracy, in congruence with the user's preferences.

Ultimately, the new and/or revised template generator document 436 may be used to generate a new corpus and/or a revised corpus of synthetic ML model training documents 440 by continuing performing the method 500 at Operation 504. Iterative training, testing, evaluating, revising, and training, etc., may continually improve the accuracy and efficiency of the trained ML model 426 in processing input documents for extracting desired data, for example, automatically extracting structured data from input documents in non-uniform formats that may change from time to time.

Figure 6:
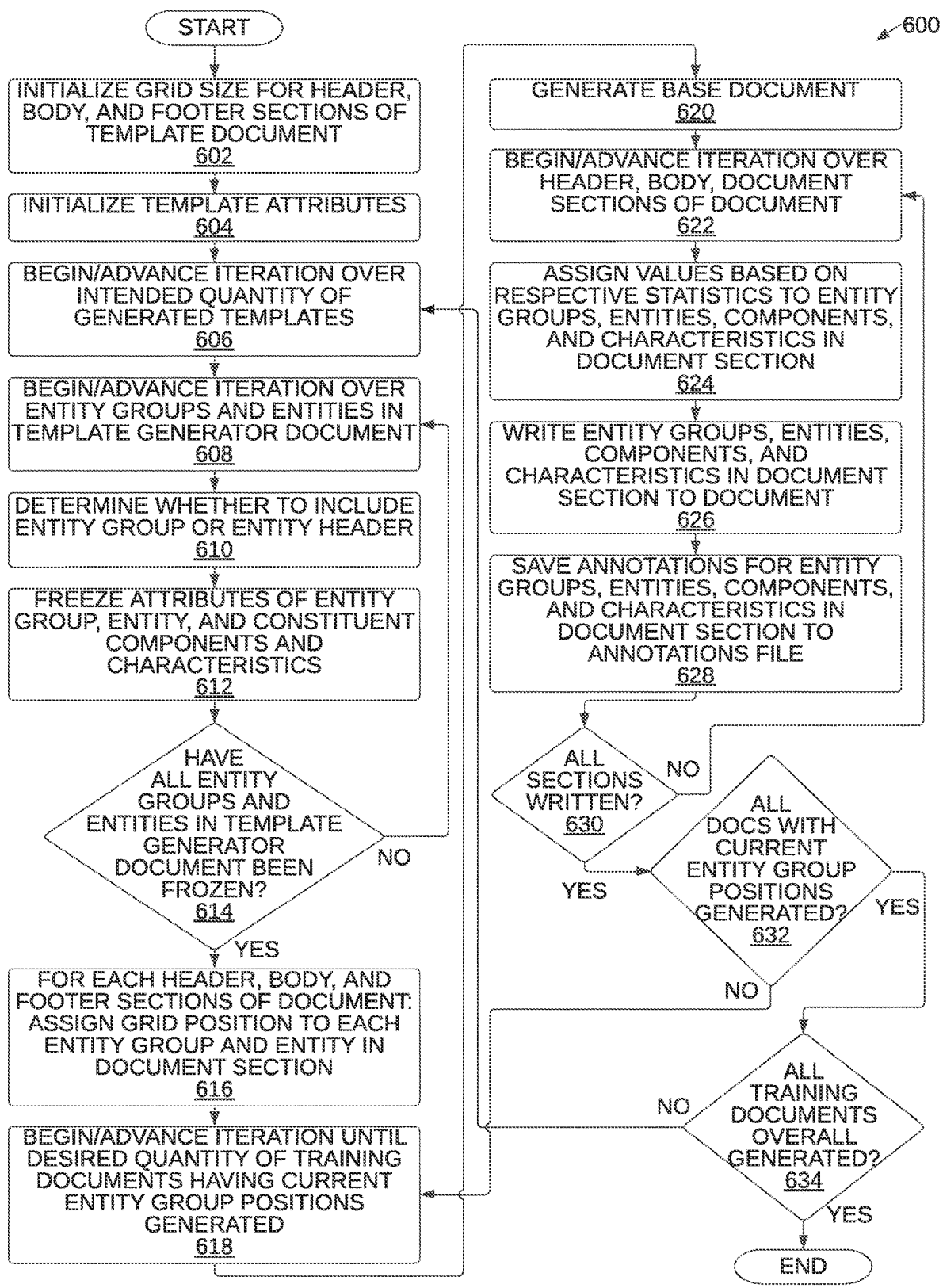
FIG. 6 shows a block diagram that illustrates an example set of operations for generating a template document and synthetic ML model training document in accordance with one or more embodiments.

FIG. 6 shows a block diagram that illustrates an example set of operations 600 for generating a template document 438 and synthetic ML model training document 440 in accordance with one or more embodiments. Generating the template document 438 and synthetic ML model training document 440 may be performed by the document processing system 410 based on a template generator document 436. One or more operations illustrated in FIG. 6 may be modified, rearranged, or omitted altogether. Accordingly, the particular sequence of operations illustrated in FIG. 6 should not be construed as limiting the scope of one or more embodiments.

A grid size of a canvas for a section of a template document 438 (e.g., header or top, body or middle, and footer or bottom) may be initialized (Operation 602). Initializing the grid size may include fixing the size (e.g., dimensions) of each section of the template document 438 page as an N×M grid. For example, a footer section may be set to be a 3×3 grid. The dimensions N and M may be determined at least in part by defaults or preferences set in the document processing system 410. The dimensions may be determined at least in part according to a user's settings. The dimensions may be determined at least in part by dimensions of one or more entity groups and/or entities that are configured to or assigned to be included in the section. For example, an entity group and/or entity that occupies the most space vertically in a row may define the vertical size of the row. An entity group and/or entity that occupies the most space horizontally in a column may define the horizontal size of the column. The height of each row may be determined to be the maximum height of all entity groups and/or entities within the respective row. The width of each row may be determined to be the sum of the widths of all entity groups and/or entities within the respective row. The height of each column may be determined to be the sum of the heights of all entity groups and/or entities in the respective column. The width of each column may be determined to be the maximum width of all entity groups and/or entities in the respective column.

Attributes of the template document 438 may be initialized (Operation 604). Initializing the attributes may be based on attributes of entity groups, entities, components, and characteristics of the template generator document 436.

Iterations over an index value of a current template document 438 being generated may begin and may be advanced (Operation 604) to repeatedly loop through a sequence of operations until the determined quantity of template documents 438 is generated. The quantity of template documents 438 determined to be generated may be determined, for example, on the basis of a default setting or a preferences setting of the document processing system 410, a user input via a graphical user interface or document interface 402, an administrator input via the administrator interface 406, a quantity of source documents 432 analyzed to generate the template generator document 436, an extent of statistical variations detected in the source documents 432 and/or stored in the document characteristics 434, a quantity of entity groups and/or entities included in the template generator document 436, a quantity of random values to be assigned based on the template generator document 436, or other basis. Each of the template documents 438 to be generated may be assigned the section grid sizes initialized in Operation 602 and the template attributes initialized in Operation 604.

Iterations over all entity groups and entities in the template generator document 436 may begin and may be advanced (Operation 608) to repeatedly loop through a sequence of operations on and pertaining to the entity groups and entities to be included in and have values set for each of the generated templates.

For each entity group and entity, whether to include a header in the template document 438 being generated may be determined (Operation 610). The determination may be made based on a specification of a component, characteristic, and/or respective probability parameter associated with the entity group and/or entity in the template generator document 436. The determination may include utilizing the statistical function engine 422, the probability distribution definitions 448, and/or the probabilistic function definitions 450.

Attributes of the currently considered entity group or entity, and/or constituent components and characteristics thereof, may be frozen (Operation 612), for example, as discussed herein in Table 2.

If not all entity groups and entities in the template generator document 436 have yet been frozen for the template document 438 currently being generated (Operation 614), the method 600 may return to Operation 608 to consider another of the entity groups and/or entities specified in the template generator document 436. Otherwise, the method may proceed to assign grid positions to each entity group and entity in each of the sections of the template document 438 (Operation 616), for example, as described elsewhere herein.

Iterations over index values of a currently generated synthetic ML model training document 440 having the current coordinate positions of entity groups and/or entities may begin and may be advanced (Operation 618) to repeatedly loop through a sequence of operations until the determined quantity of synthetic ML model training documents 440 having the current coordinate positions of entity groups and/or entities is generated. A quantity of synthetic ML model training documents 440 generated per template document 438 may be one or more than one, and may depend on numerous factors (e.g., a default setting or a preferences setting of the document processing system 410, a user input via a graphical user interface or document interface 402, an administrator input via the administrator interface 406, a quantity of source documents 432 analyzed to generate the template generator document 436, an extent of statistical variations detected in the source documents 432 and/or stored in the document characteristics 434, a quantity of entity groups and/or entities included in the template generator document 436, a quantity of random values to be assigned based on the template generator document 436, or other basis).

A new base synthetic ML model training document 440 may be created and initialized (Operation 620). The new base synthetic ML model training document 440 may be created as a copy of the currently considered template document 438, to have variables and probabilistic characteristics replaced by fixed values (e.g., dummy values). The base synthetic ML model training document 440 may include an image file, a text file, a word processing file, a portable document format (PDF) file, and/or synthetic ML model training document 440 data stored in the data repository 430. The base synthetic ML model training document 440 may include a blank image of the document type (e.g., invoice, purchase order, receipt, statement of account, etc.) as a canvas to be written to. The base synthetic ML model training document 440 may include annotations of information regarding entity groups and/or entities written to the synthetic ML model training document 440, for example, stored in a text file.

Iterations over all sections (e.g., header or top, body or middle, footer or bottom) of the synthetic ML model training document 440 may begin and may be advanced (Operation 624) to repeatedly loop through a sequence of operations on and pertaining to the sections of the synthetic ML model training document 440.

Values may be assigned to entity groups, entities, components, and/or characteristics in the current document section of the current synthetic ML model training document 440 being generated (Operation 624). The values may be assigned by execution of a entity value selection function for each entity group and/or entity of the current synthetic ML model training document 440 being generated based on the current template document 438. The entity value selection function may be executed according to a corresponding probability specification included in the current template document 438 and/or template generator document 436. The execution of the entity value selection function may include executing the statistical function engine 422. The execution of the entity value selection function may include executing a PYTHON library FAKER to generate dummy values based on the specified type of entity (e.g., text string, date, currency, integer or floating point number), statistics and/or probabilities. The execution of the entity value selection function may include performing custom logic based on the entity group and/or entity type, for example, based on results of analyzing value patterns in the source documents 432 upon which the template document 438 and/or template generator document 436 is based. The execution of the entity value selection function may be performed with data from the probability distribution definitions 448 and/or probabilistic function definitions 450. The execution of the entity value selection function may be performed according to respective parameters and conditions specified in the current template document 438 and/or template generator document 436.

The entity groups, entities, components, and characteristics in the current document section may be written, with the values assigned in Operation 622, to the current synthetic ML model training document 440 being generated (Operation 624), for example, as described elsewhere herein.

Annotations for the entity groups, entities, components, and characteristics in the current document section may be saved to an annotations file, for example, as described elsewhere herein.

If all document sections for the current synthetic ML model training document 440 being generated have not yet been written to the appropriate files (Operation 630), then the method 600 may return to Operation 622 to continue the iteration over the sections of the current synthetic ML model training document 440. Otherwise, the current synthetic ML model training document 440 may be finished being generated for training an ML model, and if all the intended synthetic ML model training documents 440 having the current entity group and entity positions of the current template document 438 have not yet been generated (Operation 632), the method 600 may return to Operation 618 to continue the iterations over the quantity of synthetic ML model training documents 440 having the current entity group and entity positions of the current template document 438 intended to be generated. Otherwise, all of the intended quantity of synthetic ML model training documents 440 having the current entity group and entity positions of the current template document 438 may have been generated for training an ML model, and if all the intended synthetic ML model training documents 440 overall for the current template generator document 436 have not yet been generated (Operation 634), the method 600 may return to Operation 606 to continue the iterations over the quantity of template documents 438 intended to be generated based on the template generator document 436. Otherwise, all of the quantity of template documents 438 and synthetic ML model training documents 440 intended to be generated based on the template generator document 436 may have been generated and the method 600 may end.

5. Illustrative Examples

Illustrative examples are described below for purposes of clarity. Components and/or operations described below should be understood as one specific example which may not be applicable to certain embodiments. Accordingly, components and/or operations described below should not be construed as limiting the scope of any of the claims.

FIG. 7 shows an example invoice 700 of a synthetic ML model training document 440 illustrating layout adjustments made by the dynamic virtual grid engine 418. While the example invoice 700 illustrates vertical and horizontal lines 705 separating individual elements of the 4×3 grid having 4 rows and 3 columns, it should be noted that these lines 705 are shown in FIG. 7 to illustrate the grid for pedagogical purposes, but may not be included or shown in an invoice or synthetic ML model training document 440 generated by the document processing system 410. As shown in the invoice 700, the height and width of the rows and columns of the grid may be dynamic and unequal, as the height and width of each row and column of the grid may be based on a size of the largest entity group and/or entity within the respective row or column.

Figure 8B:
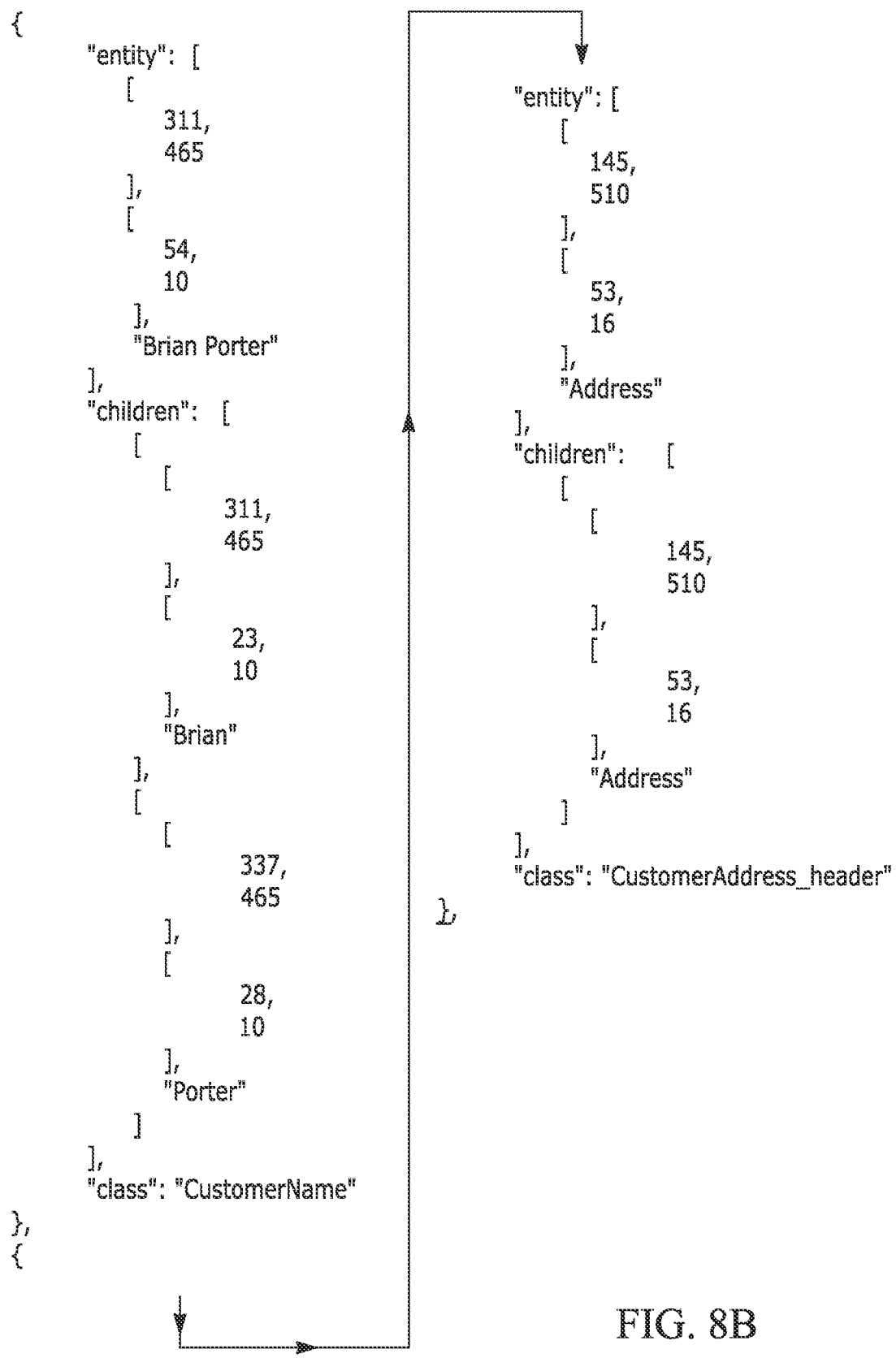
Figure 8C:
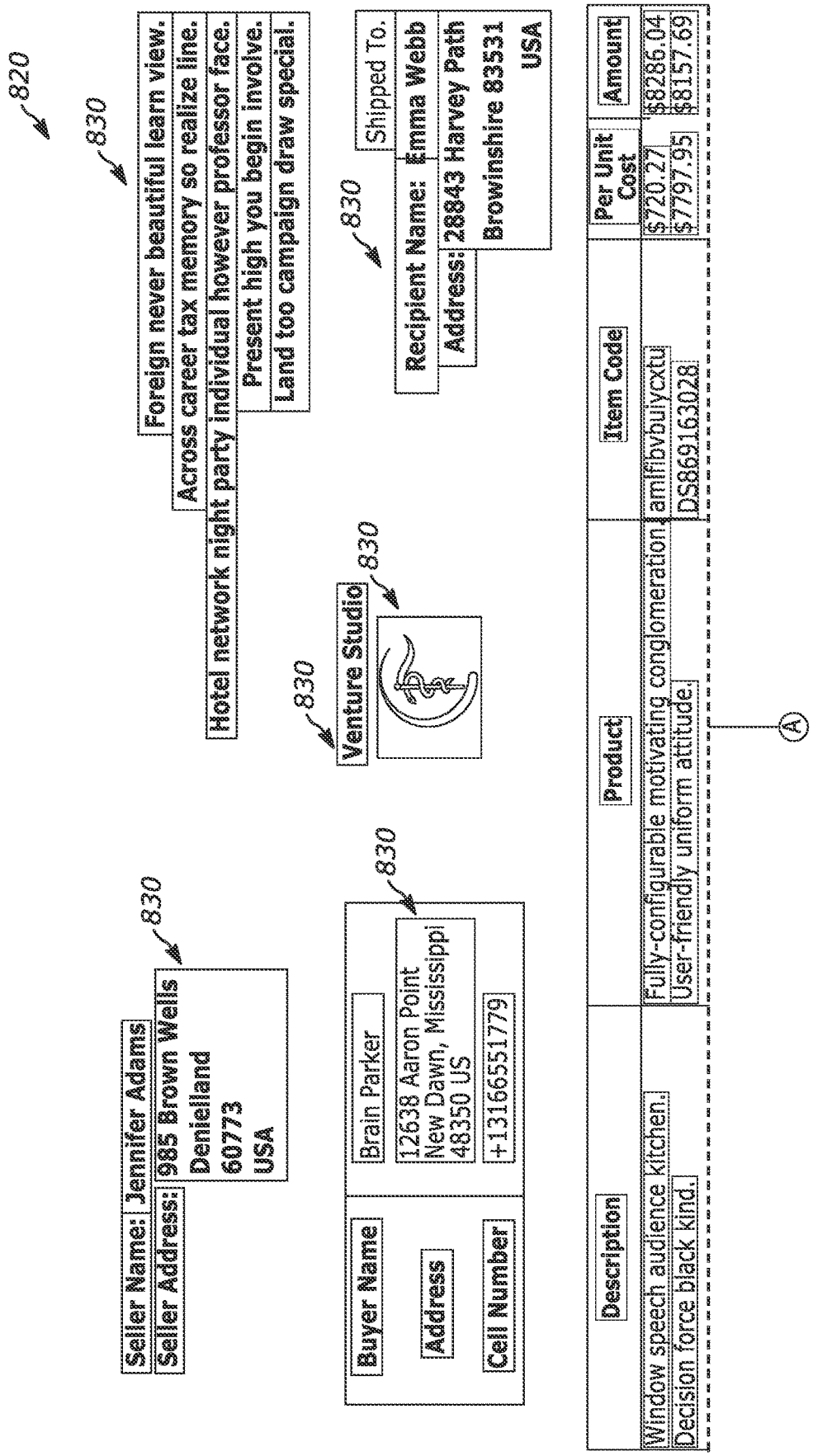

FIGS. 8A, 8B, and 8C show an example of an invoice 800 generated as a synthetic ML model training document 440, an example subset of annotations 810 for entity groups and/or entities included in the invoice, and the example invoice 820 having the annotated entity groups and/or entities highlighted, respectively. The entity groups and/or entities may be highlighted with bounding boxes 830. In various embodiments, the entity groups and/or entities may be highlighted with color highlighting or other visual means to distinguish between different entity groups and/or entities.

FIGS. 9A, 9B, and 9C show an example of an invoice generated as a synthetic ML model training document 440, an example subset of annotations for entity groups and/or entities included in the invoice, and the example invoice having the annotated entity groups and/or entities highlighted, respectively. The entity groups and/or entities may be highlighted with bounding boxes 930. In various embodiments, the entity groups and/or entities may be highlighted with color highlighting or other visual means to distinguish between different entity groups and/or entities.

A single template generator document 436 may be created by the document processing system 410 based on analyzing a number of source documents 432 that are a subset of a type and format of document that an ML model is desired to be trained to process for data extraction. The template generator document 436 may include specifications for components and characteristics of various entity groups and/or entities representative of the type of analyzed source documents 432 as a group, including potential values and positions as well as associated probabilities. The document processing system 410 may then use the single template generator document 436 to create a large corpus (e.g., thousands, hundreds of thousands, millions, or more) of template documents 438 having randomly assigned entity group and/or entity positions, components, and characteristics that are statistically representative of the originally analyzed group of source documents 432. In addition, a larger corpus of synthetic ML model training documents 440 may be generated from the corpus of template documents 438 by randomly assigning values based on the probabilities specified in the template generator document 436, such that the corpus of synthetic ML model training documents 440 are statistically representative of the originally analyzed group of source documents 432.

The large corpus of ML model training documents 440 facilitates accurate training of the ML model 426. The inclusion of the annotations in a separate file, separate from the image of the respective synthetic ML model training document 440, facilitates more accurate training of the ML model 426. It would not be feasible for a human to generate the large corpus of ML model training documents 440, especially coupled with the annotations for training the ML model 426, by hand without the systems and methods described herein. The systems and methods described herein facilitate comprehensive and accurate training of ML models 426 using a large corpus of annotated synthetic ML model training documents 440 based on a statistically characterized much smaller sample set of source documents 432.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
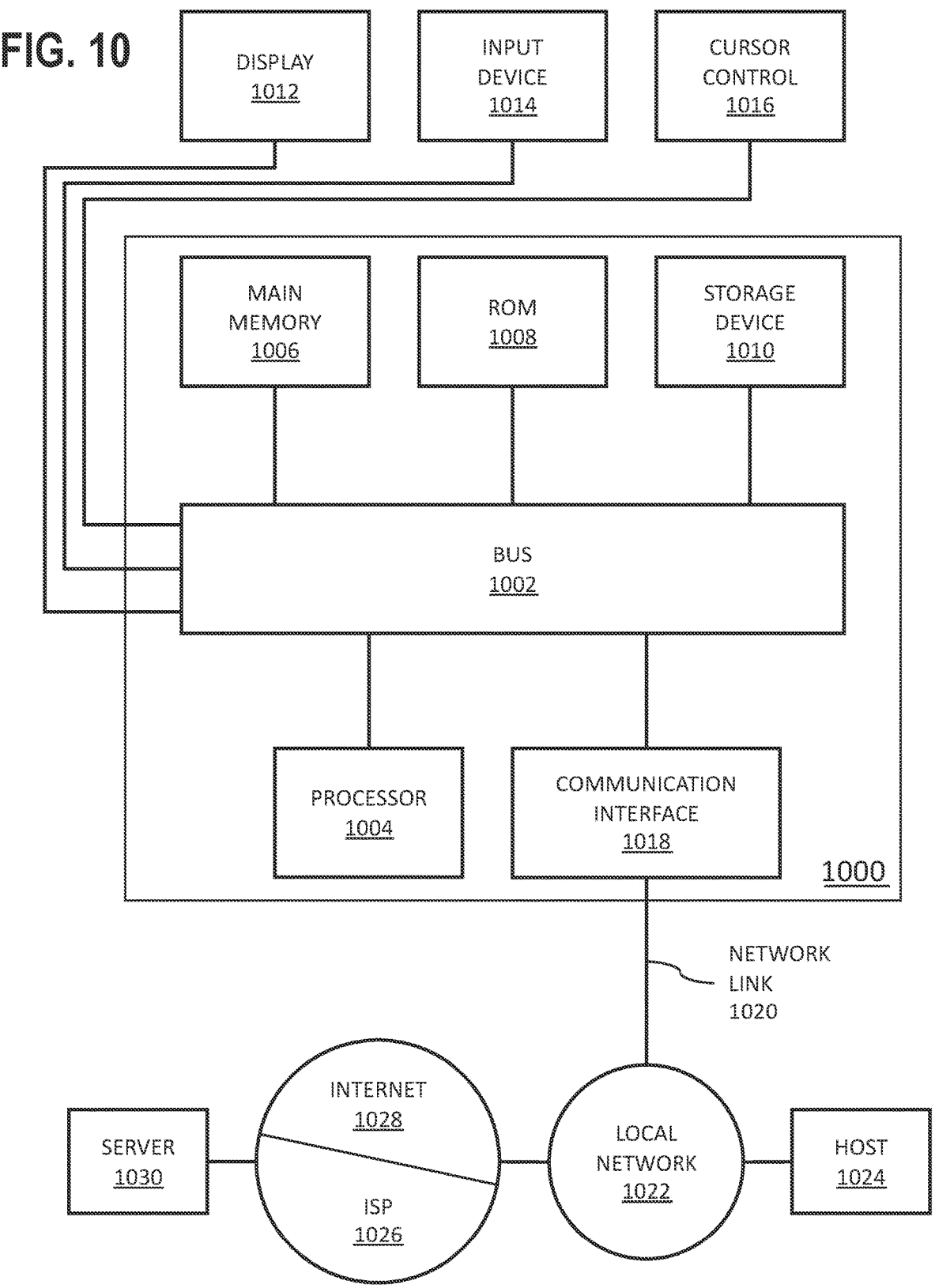
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a liquid crystal display (LCD), plasma display, electronic ink display, cathode ray tube (CRT) monitor, or any other kind of device for displaying information to a computer user. An input device 1014, including alphanumeric and other keys, may be coupled to bus 1002 for communicating information and command selections to processor 1004. Alternatively or in addition, the computer system 1000 may receive user input via a cursor control 1016, such as a mouse, a trackball, a trackpad, a touchscreen, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. The display 1012 may be configured to receive user input via one or more pressure-sensitive sensors, multi-touch sensors, and/or gesture sensors. Alternatively or in addition, the computer system 1000 may receive user input via a microphone, video camera, and/or some other kind of user input device (not shown).

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 1000 can receive the data from the network and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

8A. Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

8B. Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more hardware processors, cause performance of operations comprising:
   accessing a template generator document specifying:
      a first probability associated with a first entity; and
      a second probability associated with a second entity;
   generating a first template, of a plurality of templates, based on the template generator document, wherein generating the first template comprises:
      executing a first randomization function based on the first probability to determine whether to include the first entity in the first template;
      based on a first result corresponding to the execution of the first randomization function, including the first entity in the first template;
      executing a second randomization function based on the second probability to determine whether to include the second entity in the first template; and
      based on a second result corresponding to the execution of the second randomization function, including the second entity in the first template; and
   generating a second template, of the plurality of templates, based on the template generator document, wherein generating the second template comprises:
      executing a third randomization function based on the first probability to determine whether to include the first entity in the second template;
      based on a third result corresponding to the execution of the third randomization function, including the first entity in the second template;
      executing a fourth randomization function based on the second probability to determine whether to include the second entity in the second template; and
      based on a fourth result corresponding to the execution of the fourth randomization function, refraining from including the second entity in the second template.

2. The media of claim 1 further storing instructions which, when executed by one or more hardware processors, cause performance of operations comprising:
   generating, based on the first template, a first synthetic document configured for ML model training, by at least assigning a first value to the first entity based on a first designated value pattern;
   generating, based on the first template, a second synthetic document configured for ML model training, by at least assigning a second value to the first entity based on the first designated value pattern, the second value being different from the first value;
   generating, based on the second template, a third synthetic document configured for ML model training, by at least assigning a third value to the first entity based on a second designated value pattern; and
   generating, based on the second template, a fourth synthetic document configured for ML model training, by at least assigning a fourth value to the first entity based on the second designated value pattern, the fourth value being different from the third value.

3. The media of claim 2, wherein the first designated value pattern comprises a plurality of candidate values and an assignment probability associated with each of the plurality of candidate values.

4. The media of claim 3, wherein the template generator document specifies at least: a plurality of characteristics of the first entity including the first probability and the first designated value pattern, and a plurality of characteristics of the second entity including the second probability and the second designated value pattern.

5. The media of claim 1, wherein:
   the template generator document further specifies a third probability associated with a third entity;
   generating the first template further comprises:
      executing a fifth randomization function based on the third probability to determine whether to include the third entity in the first template; and
      based on a fifth result corresponding to the execution of the fifth randomization function, including the third entity in the first template; and
   generating the second template further comprises:
      executing a sixth randomization function based on the third probability to determine whether to include the third entity in the second template; and
      based on a sixth result corresponding to the execution of the sixth randomization function, including the third entity in the second template.

6. The media of claim 5, wherein the operations further comprise:
   based on the template generator document further specifying a characteristic of the third entity as a required characteristic:
      including the required characteristic of the third entity in the first template; and
      including the required characteristic of the third entity in the second template.

7. The media of claim 1, wherein:
   the template generator document further specifies:
      a first component probability associated with a first component of the first entity; and
      a second component probability associated with a second component of the first entity; and
   generating the first template further comprises:
      executing a fifth randomization function based on the first component probability to determine whether to include the first component of the first entity in the first template; and
      based further on a fifth result corresponding to the execution of the fifth randomization function, including the first component of the first entity in the first template;
      executing a sixth randomization function based on the second component probability to determine whether to include the second component of the first entity in the first template; and based further on a sixth result corresponding to the execution of the sixth randomization function, refraining from including the second component of the first entity in the first template.

8. The media of claim 7, wherein the operations further comprise:
based on the template generator document further specifying a third component of the first entity as a required component:
including the third component of the first entity in the first template; and
including the third component of the first entity in the second template.

9. The media of claim 1 further storing instructions which, when executed by one or more hardware processors, cause performance of operations comprising generating the template generator document by at least analyzing a plurality of representative documents to identify characteristics of the plurality of representative documents.

10. The media of claim 1 further storing instructions which, when executed by one or more hardware processors, cause performance of operations comprising generating the template generator document by at least analyzing feedback from an ML model trained based on a synthetic document generated from the first and/or second template.

11. The media of claim 1, wherein the operations further comprise:
based on the template generator document further specifying a third entity as a required entity:
including the fourth entity in the first template; and
including the fourth entity in the second template.

12. The media of claim 1, wherein:
the template generator document further specifies a plurality of candidate values associated with a third entity; and
generating the first template further comprises:
executing a fifth randomization function to select a candidate value of the plurality of candidate values for the third entity;
based on a fifth result corresponding to the execution of the fifth randomization function, defining the third entity with the candidate value; and
including the third entity defined with the candidate value in the first template.

13. The media of claim 1, wherein the operations are performed by a machine learning model training document generation system.

14. One or more non-transitory machine-readable media storing instructions which, when executed by one or more hardware processors, cause performance of operations comprising:
accessing a template generator document for generating a plurality of templates configured for synthetic document generation, the template generator document specifying:
a first plurality of candidate characteristics for a first entity; and
a second plurality of candidate characteristics for a second entity;
generating a first template, of the plurality of templates, based on the template generator document, wherein generating the first template comprises:
executing a first randomization function to select a first characteristic, of the first plurality of candidate characteristics, for the first entity;
based on a first result corresponding to the execution of the first randomization function, defining the first entity, for the first template, with the first characteristic;
executing a second randomization function to select a second characteristic, of the second plurality of candidate characteristics, for the second entity; and
based on a second result corresponding to the execution of the second randomization function, defining the second entity, for the first template, with the second characteristic; and
generating a second template, of the plurality of templates, based on the template generator document, wherein generating the second template comprises:
executing a third randomization function to select a third characteristic, of the first plurality of candidate characteristics, for the first entity;
based on a third result corresponding to the execution of the third randomization function, defining the first entity, for the second template, with the third characteristic;
executing a fourth randomization function to select the second characteristic, of the second plurality of candidate characteristics, for the second entity; and
based on a fourth result corresponding to the execution of the fourth randomization function, defining the second entity, for the second template, with the second characteristic.

15. The media of claim 14 further storing instructions which, when executed by one or more hardware processors, cause performance of operations comprising:
generating, based on the first template, a first synthetic document configured for ML model training, by at least assigning a first value to the first entity based on a first designated value pattern;
generating, based on the first template, a second synthetic document configured for ML model training, by at least assigning a second value to the first entity based on the first designated value pattern, the second value being different from the first value;
generating, based on the second template, a third synthetic document configured for ML model training, by at least assigning a third value to the second entity based on a second designated value pattern; and
generating, based on the second template, a fourth synthetic document configured for ML model training, by at least assigning a fourth value to the second entity based on the second designated value pattern, the fourth value being different from the third value.

16. The media of claim 15, wherein the first designated value pattern comprises a plurality of candidate values and an assignment probability associated with each of the plurality of candidate values.

17. The media of claim 15, wherein the template generator document specifies at least the first designated value pattern and the second designated value pattern.

18. The media of claim 15, wherein generating the first synthetic document further comprises rendering the first entity at a first document coordinate and rendering the second entity at a second document coordinate according to a first virtual grid, and generating the second synthetic document further comprises rendering the first entity at a third document coordinate and rendering the second entity at a fourth document coordinate according to a second virtual grid.

19. The media of claim 14, wherein:
the template generator document further specifies a third probability associated with a third entity;
generating the first template further comprises:
executing a fifth randomization function based on the third probability to determine whether to include the third entity in the first template; and
based on a fifth result corresponding to the execution of the fifth randomization function, including the third entity in the first template; and
generating the second template further comprises:
executing a sixth randomization function based on the third probability to determine whether to include the third entity in the second template; and
based on a sixth result corresponding to the execution of the sixth randomization function, refraining from including the third entity in the second template.

20. The media of claim 19, wherein:
based on the template generator document further specifying a characteristic of the third entity as a required characteristic:
including the required characteristic of the third entity in the first template.

21. The media of claim 19, wherein the operations further comprise:
based on the template generator document further specifying a fourth entity as a required entity;
including the fourth entity in the first template; and
including the fourth entity in the second template.

22. The media of claim 14, wherein:
the template generator document further specifies:
a first component probability associated with a first component of the first entity; and
a second component probability associated with a second component of the first entity; and
generating the first template further comprises:
executing a fifth randomization function based on the first component probability to determine whether to include the first component of the first entity in the first template; and
based further on a fifth result corresponding to the execution of the fifth randomization function, including the first component of the first entity in the first template;
executing a sixth randomization function based on the second component probability to determine whether to include the second component of the first entity in the first template; and
based further on a sixth result corresponding to the execution of the sixth randomization function, refraining from including the second component of the first entity in the first template.

23. The media of claim 22, wherein:
based on the template generator document further specifying a third component of the first entity as a required component:
including the third component of the first entity in the first template; and
including the third component of the first entity in the second template.

24. The media of claim 14 further storing instructions which, when executed by one or more hardware processors, cause performance of operations comprising generating the template generator document by at least analyzing a plurality of representative documents to identify characteristics of the plurality of representative documents.

25. The media of claim 14 further storing instructions which, when executed by one or more hardware processors, cause performance of operations comprising generating the template generator document by at least analyzing feedback from an ML model trained based on a synthetic document generated from the first and/or second template.

26. The media of claim 14, wherein:
the template generator document further specifies a plurality of candidate values associated with a third entity; and
generating the first template further comprises:
executing a fifth randomization function to select a candidate value of the plurality of candidate values for the third entity;
based on a fifth result corresponding to the execution of the fifth randomization function, defining the third entity with the candidate value; and
including the third entity defined with the selected candidate value in the first template.

27. The media of claim 14, wherein the operations are performed by a machine learning model training document generation system.

28. A method of generating a plurality of templates configured for synthetic machine learning (ML) model training document generation, the method comprising:
accessing, by a computing processor-based document processing system, a template generator document specifying:
a first probability associated with a first entity; and
a second probability associated with a second entity;
generating, by a computing processor-based document processing system, a first template, of a plurality of templates, based on the template generator document, wherein generating the first template comprises:
executing a first randomization function based on the first probability to determine whether to include the first entity in the first template;
based on a first result corresponding to the execution of the first randomization function, including the first entity in the first template;
executing a second randomization function based on the second probability to determine whether to include the second entity in the first template; and
based on a second result corresponding to the execution of the second randomization function, including the second entity in the first template; and
generating, by a computing processor-based document processing system, a second template, of the plurality of templates, based on the template generator document, wherein generating the second template comprises:
executing a third randomization function based on the first probability to determine whether to include the first entity in the second template;
based on a third result corresponding to the execution of the third randomization function, including the first entity in the second template;
executing a fourth randomization function based on the second probability to determine whether to include the second entity in the second template; and
based on a fourth result corresponding to the execution of the fourth randomization function, refraining from including the second entity in the second template.

29. A method of generating a plurality of templates configured for synthetic machine learning (ML) model training document generation, the method comprising:

accessing, by a computing processor-based document processing system, a template generator document for generating a plurality of templates configured for synthetic document generation, the template generator document specifying:
- a first plurality of candidate characteristics for a first entity; and
- a second plurality of candidate characteristics for a second entity;

generating, by a computing processor-based document processing system, a first template, of the plurality of templates, based on the template generator document, wherein generating the first template comprises:
- executing a first randomization function to select a first characteristic, of the first plurality of candidate characteristics, for the first entity;
- based on a first result corresponding to the execution of the first randomization function, defining the first entity, for the first template, with the first characteristic;
- executing a second randomization function to select a second characteristic, of the second plurality of candidate characteristics, for the second entity; and
- based on a second result corresponding to the execution of the second randomization function, defining the second entity, for the first template, with the second characteristic; and generating, by a computing processor-based document processing system, a second template, of the plurality of templates, based on the template generator document, wherein generating the second template comprises:
- executing a third randomization function to select a third characteristic, of the first plurality of candidate characteristics, for the first entity;
- based on a third result corresponding to the execution of the third randomization function, defining the first entity, for the second template, with the third characteristic;
- executing a fourth randomization function to select the second characteristic, of the second plurality of candidate characteristics, for the second entity; and
- based on a fourth result corresponding to the execution of the fourth randomization function, defining the second entity, for the second template, with the second characteristic.

* * * * *